US011785272B1

(12) United States Patent
Singh

(10) Patent No.: US 11,785,272 B1
(45) Date of Patent: Oct. 10, 2023

(54) SELECTING TIMES OR DURATIONS OF ADVERTISEMENTS DURING EPISODES OF MEDIA PROGRAMS

(71) Applicant: Amazon Technologies, Inc., Seattle, WA (US)

(72) Inventor: Vijai Singh, Rancho Palos Verdes, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/542,116

(22) Filed: Dec. 3, 2021

(51) Int. Cl.
*H04N 21/262* (2011.01)
*H04N 21/466* (2011.01)
*H04N 21/81* (2011.01)
*G06Q 30/0251* (2023.01)
*H04N 21/25* (2011.01)

(52) U.S. Cl.
CPC ... *H04N 21/26241* (2013.01); *G06Q 30/0264* (2013.01); *H04N 21/251* (2013.01); *H04N 21/4662* (2013.01); *H04N 21/812* (2013.01)

(58) Field of Classification Search
CPC .......... H04N 21/251; H04N 21/26241; H04N 21/4662; H04N 21/812; G06Q 30/0264
See application file for complete search history.

(56) References Cited

U.S. PATENT DOCUMENTS

| | | | |
|---|---|---|---|
| 8,023,800 B2 | 9/2011 | Concotelli | |
| 8,560,683 B2 | 10/2013 | Funk et al. | |
| 8,572,243 B2 | 10/2013 | Funk et al. | |
| 8,768,782 B1 | 7/2014 | Myslinski | |
| 8,850,301 B1 | 9/2014 | Rose | |
| 9,003,032 B2 | 4/2015 | Funk et al. | |
| 9,369,740 B1 | 6/2016 | Funk et al. | |

(Continued)

FOREIGN PATENT DOCUMENTS

| | | |
|---|---|---|
| AU | 2013204532 B2 | 11/2014 |
| CA | 2977959 A1 | 9/2016 |

(Continued)

OTHER PUBLICATIONS

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

(Continued)

*Primary Examiner* — Jefferey F Harold
*Assistant Examiner* — Alexander Boyd
(74) *Attorney, Agent, or Firm* — Athorus, PLLC

(57) ABSTRACT

A creator of a media program is recommended to air an advertisement at a time or for a duration during an episode of the media program. The time or the duration are determined based on numbers of listeners to the episode of the media program, which may be predicted based on attributes of the creator or the media program, and attributes of other creators or other media programs, as well as listenership of episodes of the other programs. A machine learning model is trained to associate attributes of creators or media programs with listenership, and slots or other portions of an episode of a media program are identified for a creator of the episode of the media program based on outputs received from the machine learning model.

20 Claims, 25 Drawing Sheets

(56) References Cited

U.S. PATENT DOCUMENTS

| | | | |
|---|---|---|---|
| 9,613,636 | B2 | 4/2017 | Gibbon et al. |
| 9,706,253 | B1 | 7/2017 | Funk et al. |
| 9,729,596 | B2 | 8/2017 | Sanghavi et al. |
| 9,781,491 | B2 | 10/2017 | Wilson |
| 9,872,069 | B1 | 1/2018 | Funk et al. |
| 10,083,169 | B1 | 9/2018 | Ghosh et al. |
| 10,091,547 | B2 | 10/2018 | Sheppard et al. |
| 10,110,952 | B1 | 10/2018 | Gupta et al. |
| 10,135,887 | B1 | 11/2018 | Esser et al. |
| 10,140,364 | B1 | 11/2018 | Diamondstein |
| 10,178,422 | B1 | 1/2019 | Panchaksharaiah et al. |
| 10,178,442 | B2 | 1/2019 | Shkedi |
| 10,313,726 | B2 | 6/2019 | Woods et al. |
| 10,356,476 | B2 | 7/2019 | Dharmaji |
| 10,432,335 | B2 | 10/2019 | Bretherton |
| 10,489,395 | B2 | 11/2019 | Lakkur et al. |
| 10,685,050 | B2 | 6/2020 | Krishna et al. |
| 10,698,906 | B2 | 6/2020 | Hargreaves et al. |
| 10,719,837 | B2 | 7/2020 | Kolowich et al. |
| 10,769,678 | B2 | 9/2020 | Li |
| 10,846,330 | B2 | 11/2020 | Shilo |
| 10,985,853 | B2 | 4/2021 | Bretherton |
| 10,986,064 | B2 | 4/2021 | Siegel et al. |
| 10,997,240 | B1 | 5/2021 | Aschner et al. |
| 11,431,660 | B1 | 8/2022 | Leeds et al. |
| 11,451,863 | B1 | 9/2022 | Benjamin et al. |
| 11,463,772 | B1 | 10/2022 | Wanjari et al. |
| 11,521,179 | B1 | 12/2022 | Shetty |
| 11,580,982 | B1 | 2/2023 | Karnawat et al. |
| 11,586,344 | B1 | 2/2023 | Balagurunathan et al. |
| 2002/0042920 | A1 | 4/2002 | Thomas et al. |
| 2002/0056087 | A1 | 5/2002 | Berezowski et al. |
| 2006/0268667 | A1 | 11/2006 | Jellison et al. |
| 2007/0124756 | A1 | 5/2007 | Covell et al. |
| 2007/0271518 | A1 | 11/2007 | Tischer et al. |
| 2007/0271580 | A1 | 11/2007 | Tischer et al. |
| 2008/0086742 | A1 | 4/2008 | Aldrey et al. |
| 2009/0044217 | A1 | 2/2009 | Lutterbach et al. |
| 2009/0076917 | A1 | 3/2009 | Jablokov et al. |
| 2009/0100098 | A1 | 4/2009 | Feher et al. |
| 2009/0254934 | A1 | 10/2009 | Grammens |
| 2010/0088187 | A1 | 4/2010 | Courtney et al. |
| 2010/0280641 | A1 | 11/2010 | Harkness et al. |
| 2011/0063406 | A1 | 3/2011 | Albert et al. |
| 2011/0067044 | A1 | 3/2011 | Albo |
| 2012/0040604 | A1 | 2/2012 | Amidon et al. |
| 2012/0191774 | A1 | 7/2012 | Bhaskaran et al. |
| 2012/0304206 | A1 | 11/2012 | Roberts et al. |
| 2012/0311618 | A1 | 12/2012 | Blaxland |
| 2012/0331168 | A1 | 12/2012 | Chen |
| 2013/0074109 | A1 | 3/2013 | Skelton et al. |
| 2013/0247081 | A1 | 9/2013 | Vinson et al. |
| 2013/0253934 | A1 | 9/2013 | Parekh et al. |
| 2014/0019225 | A1 | 1/2014 | Guminy et al. |
| 2014/0040494 | A1 | 2/2014 | Deinhard et al. |
| 2014/0068432 | A1 | 3/2014 | Kucharz et al. |
| 2014/0073236 | A1 | 3/2014 | Iyer |
| 2014/0108531 | A1 | 4/2014 | Klau |
| 2014/0123191 | A1 | 5/2014 | Hahn et al. |
| 2014/0228010 | A1 | 8/2014 | Barbulescu et al. |
| 2014/0325557 | A1 | 10/2014 | Evans et al. |
| 2014/0372179 | A1 | 12/2014 | Ju et al. |
| 2015/0163184 | A1 | 6/2015 | Kanter et al. |
| 2015/0242068 | A1 | 8/2015 | Losey et al. |
| 2015/0248798 | A1 | 9/2015 | Howe et al. |
| 2015/0289021 | A1 | 10/2015 | Miles |
| 2015/0319472 | A1 | 11/2015 | Kotecha et al. |
| 2015/0326922 | A1 | 11/2015 | Givon et al. |
| 2016/0093289 | A1 | 3/2016 | Pollet |
| 2016/0188728 | A1 | 6/2016 | Gill et al. |
| 2016/0217488 | A1 | 7/2016 | Ward et al. |
| 2016/0266781 | A1 | 9/2016 | Dandu et al. |
| 2016/0293036 | A1 | 10/2016 | Niemi et al. |
| 2016/0330529 | A1 | 11/2016 | Byers |
| 2017/0127136 | A1 | 5/2017 | Roberts et al. |
| 2017/0164357 | A1 | 6/2017 | Fan et al. |
| 2017/0213248 | A1 | 7/2017 | Jing et al. |
| 2017/0289617 | A1 | 10/2017 | Song et al. |
| 2017/0329466 | A1 | 11/2017 | Krenkler et al. |
| 2017/0366854 | A1* | 12/2017 | Puntambekar ..... H04N 21/4662 |
| 2018/0025078 | A1 | 1/2018 | Quennesson |
| 2018/0035142 | A1 | 2/2018 | Rao et al. |
| 2018/0205797 | A1 | 7/2018 | Faulkner |
| 2018/0227632 | A1* | 8/2018 | Rubin ................ H04N 21/4788 |
| 2018/0255114 | A1 | 9/2018 | Dharmaji |
| 2018/0293221 | A1 | 10/2018 | Finkelstein et al. |
| 2018/0322411 | A1 | 11/2018 | Wang et al. |
| 2018/0367229 | A1 | 12/2018 | Gibson et al. |
| 2019/0065610 | A1 | 2/2019 | Singh |
| 2019/0132636 | A1 | 5/2019 | Gupta et al. |
| 2019/0156196 | A1 | 5/2019 | Zoldi et al. |
| 2019/0171762 | A1 | 6/2019 | Luke et al. |
| 2019/0273570 | A1 | 9/2019 | Bretherton |
| 2019/0327103 | A1 | 10/2019 | Niekrasz |
| 2019/0385600 | A1 | 12/2019 | Kim |
| 2020/0021888 | A1 | 1/2020 | Brandao et al. |
| 2020/0160458 | A1 | 5/2020 | Bodin et al. |
| 2020/0226418 | A1 | 7/2020 | Dorai-Raj et al. |
| 2020/0279553 | A1 | 9/2020 | McDuff et al. |
| 2021/0104245 | A1 | 4/2021 | Aguilar Alas et al. |
| 2021/0105149 | A1 | 4/2021 | Roedel et al. |
| 2021/0125054 | A1 | 4/2021 | Banik et al. |
| 2021/0160588 | A1 | 5/2021 | Joseph et al. |
| 2021/0210102 | A1 | 7/2021 | Huh et al. |
| 2021/0217413 | A1 | 7/2021 | Tushinskiy et al. |
| 2021/0232577 | A1 | 7/2021 | Ogawa et al. |
| 2021/0256086 | A1 | 8/2021 | Askarian et al. |
| 2021/0281925 | A1* | 9/2021 | Shaikh ............... G06Q 30/0243 |
| 2021/0366462 | A1 | 11/2021 | Yang et al. |
| 2022/0038783 | A1 | 2/2022 | Wee |
| 2022/0038790 | A1 | 2/2022 | Duan et al. |
| 2022/0159377 | A1 | 5/2022 | Wilberding et al. |
| 2022/0223286 | A1 | 7/2022 | Lach et al. |
| 2022/0230632 | A1 | 7/2022 | Maitra et al. |
| 2022/0254348 | A1 | 8/2022 | Tay et al. |
| 2022/0369034 | A1 | 11/2022 | Kumar et al. |
| 2022/0417297 | A1 | 12/2022 | Daga et al. |
| 2023/0217195 | A1 | 7/2023 | Poltorak |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

Hoegen, Rens, et al. "An End-to-End Conversational Style Matching Agent." Proceedings of the 19th ACM International Conference on Intelligent Virtual Agents. 2019, pp. 1-8. (Year: 2019).

* cited by examiner

ATTRIBUTES OF CREATOR AND PROGRAM 99

LISTENERSHIP DURING EPISODE 4 OF PROGRAM 99

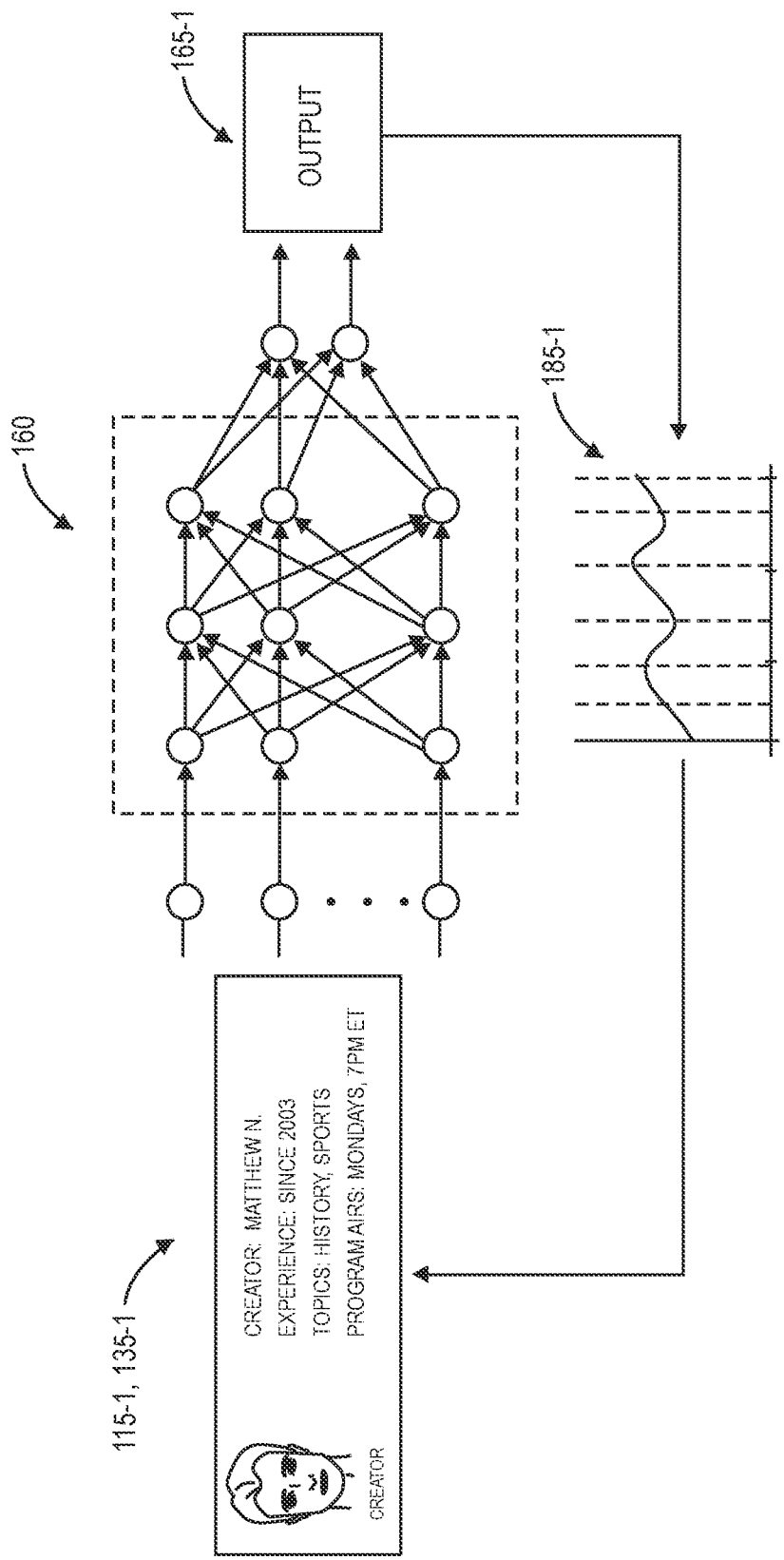

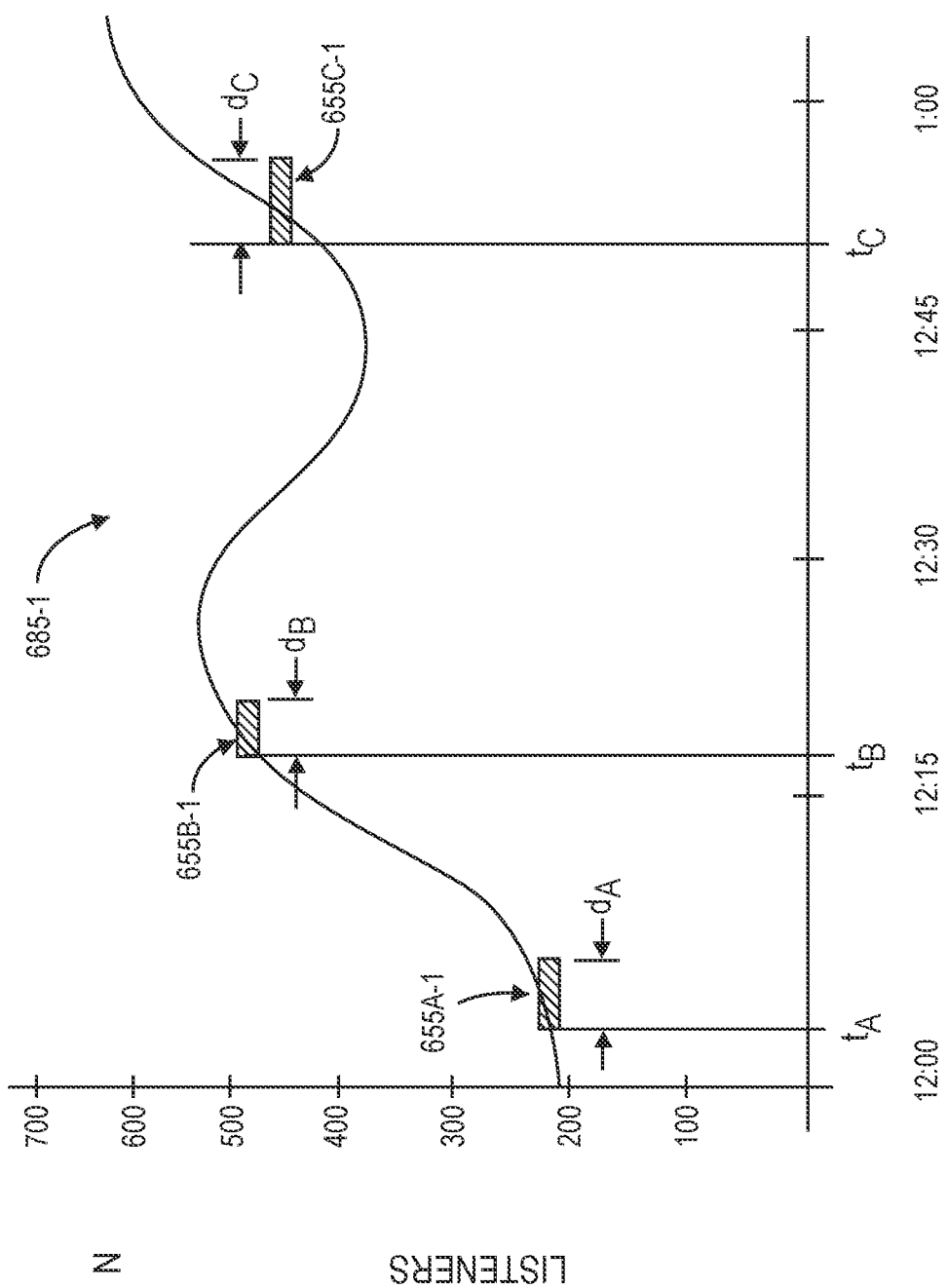

SELECTING TIMES OR DURATIONS OF ADVERTISEMENTS DURING EPISODES OF MEDIA PROGRAMS

BACKGROUND

Today, many media programs are broadcast "live" to viewers or listeners over the air, e.g., on radio or television, or streamed or otherwise transmitted to the viewers or listeners over one or more computer networks which may include the Internet in whole or in part. Episodes of such media programs may include music, comedy, "talk" radio, interviews or any other content.

Typically, media content presented to viewers or listeners in accordance with a media program is also accompanied by one or more advertisements, which are purchased by providers of goods or services, in order to promote such goods or services, to viewers or listeners to media programs. Such advertisements, which are typically presented to the viewers or listeners in the same medium as the media program, may include offers or descriptions of any type or form of goods or services, or state any other relevant information. For example, a radio broadcast or television program usually includes commercial breaks during which advertisements for goods or services are aired, and the times or durations of such breaks are commonly selected with a goal of maximizing engagement with the advertisements by viewers or listeners. Some media programs of extended durations include or require breaks at or near fixed times, e.g., at a common number of minutes after or before each hour, and air one or more advertisements during such breaks. Other media programs that are generated or aired subject to the exclusive control and discretion of their creators may include breaks at times or for durations selected by such creators, who may elect to air advertisements during such breaks.

A price of airing an advertisement during a break typically depends on a timing and a duration of the break. Advertisements that are aired at times or during programs that are expected to have larger numbers of viewers or listeners usually command a greater price than advertisements that are aired at times or during programs that are expected to have smaller numbers of viewers or listeners. Accordingly, providers of goods or services that wish to maximize their advertising reach seek to have their commercials aired during programs that are generally popular, and include the greatest practicable number of listeners. Moreover, because many advertisements are aired during regular or predictable breaks in media programs, many viewers or listeners elect to execute other tasks, such as to obtain snacks, refill drinks, or use a rest room, when advertisements are aired.

Viewers or listeners are typically drawn to media programs based on their content, which is generated based on actions and decisions of creators, who, by their choices, are ultimately responsible for numbers of listeners to episodes of their media programs and how long such listeners remain engaged during such episodes. For example, a creator of a media program may be broadly empowered not only to select times or dates on which episodes of the media program will air but also to designate topics of conversation during the media program, to identify and invite guests or listeners to participate in the media program, or to choose media entities (e.g., songs or other media content) that is to be played during the media program. A creator may also select when to take breaks during an episode of a media program, or durations of such breaks.

Nevertheless, although revenues from sales of advertisements are the lifeblood of a viable media program, few creators of media programs are skilled or trained determine when an advertisement should be aired during an episode of a media program, or to select a duration of an advertisement.

BRIEF DESCRIPTION OF THE DRAWINGS

FIGS. 1A through 1H are views of aspects of one system for selecting times or durations of advertisements in accordance with embodiments of the present disclosure.

FIG. 6A through 6L are views of aspects of one system for selecting times or durations of advertisements in accordance with embodiments of the present disclosure.

DETAILED DESCRIPTION

As is set forth in greater detail below, the present disclosure is directed to systems and methods for selecting times or durations of advertisements to be aired during episodes of media programs, for example, to maximize revenue received from such advertisements while minimizing the impact of the advertisements on listeners to the episodes. More specifically, in some implementations, the systems and methods of the present disclosure are directed to training a model (e.g., a machine learning algorithm, system or technique) using information or data representing attributes of creators and attributes of media programs, and information or data regarding listenership or listener interactivity during episodes of the media programs, e.g., numbers of listeners, or numbers of interactions received from such listeners, at times during the episodes of the media programs. Such attributes may include, but need not be limited to, media content (e.g., songs or other media entities) that is anticipated to be included in the episode, as well as any guests, listeners or other participants in the episode of the media program, any ratings of the episode, or any other information or data.

The model may be trained to predict information or data regarding listenership or listener interactivity during an episode of a media program based on attributes of a creator of the episode of the media program, or attributes of the media program.

The predicted information or data regarding the listenership or the listener interactivity of the episode of the media program may then be used to identify slots (or portions or sections) of an episode during which advertisements may be most effectively aired without risking losing listeners to the media program. One or more slots may be defined with respect to times at which an advertisement may be preferentially aired during an episode, or durations for which the advertisements may be preferentially aired during the episode, provided to the creator, either before the episode has begun, such as when the creator is preparing for or planning the episode, or while the episode is in progress. During the episode, the creator may then elect to air advertisements during one or more of such slots, e.g., at the recommended times or for the recommended durations, or during any other slots (or portions or sections) of the media program, e.g., at any other times or for any other durations. Additionally, during the episode, recommended slots (e.g., times or durations) for airing advertisements may be updated based on observed changes in the listenership or listener interactivity, and such changes may also be used to train or otherwise update the model accordingly.

Figure 1A:
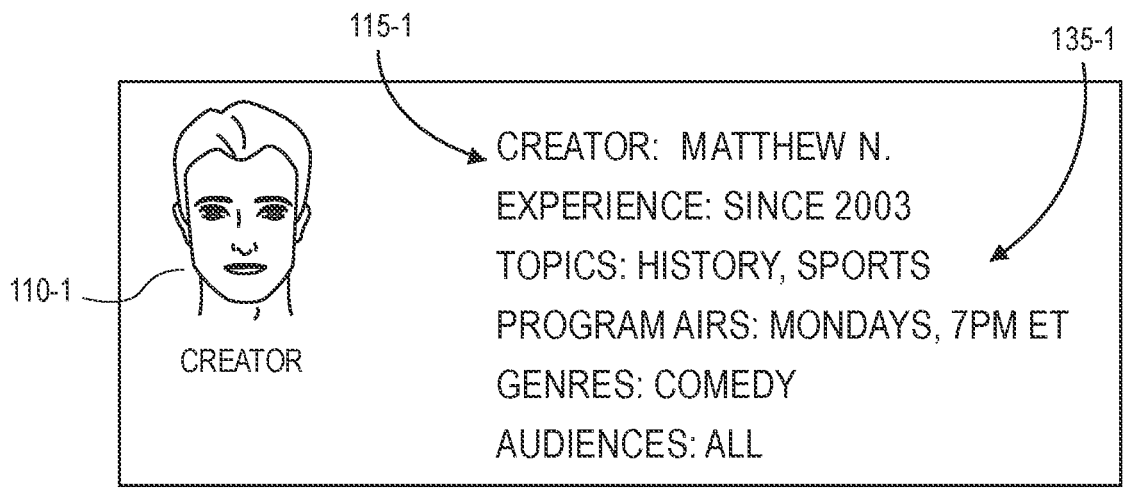

Referring to FIGS. 1A through 1H, views of aspects of one system for selecting times or durations of advertisements in accordance with embodiments of the present disclosure are shown. As is shown in FIG. 1A, attributes 115-1 of a creator 110-1 of a media program include an identity of the creator 110-1, as well as his or her history in generating content of the media program. Alternatively, the attributes 115-1 of the creator 110-1 may include any other information or data regarding the media program, including but not limited to numbers of episodes of the media program (or any other media programs) that the creator 110-1 has produced, or any other attributes. Additionally, as is also shown in FIG. 1A, attributes 135-1 of the media program include topics that are typically discussed during episodes of the media program (viz., history or sports), and times or dates when the episodes of the media program are typically aired (viz., Monday evenings at 7 o'clock p.m. Eastern Time). The attributes 135-1 of the media program may further include a genre of the media program, one or more demographics to which the media program is targeted, a rating of the content of the media program, or any other information or data regarding the media program.

Figure 1B:
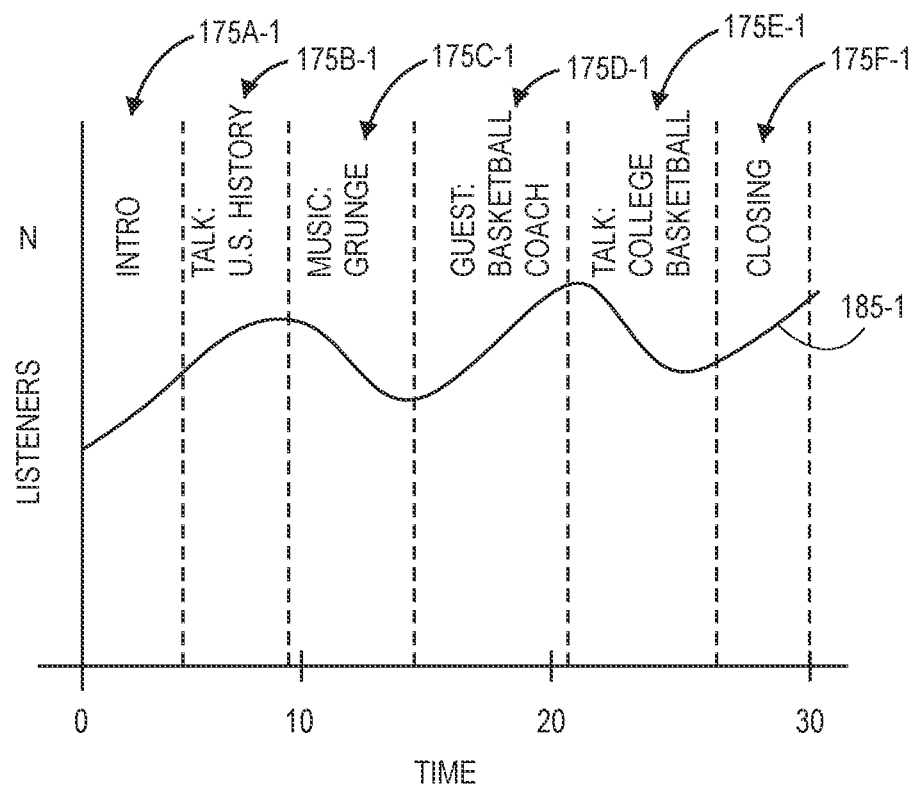

As is shown in FIG. 1B, data 185-1 regarding listenership (e.g., numbers of listeners) at times during an episode of the media program is shown. For example, the data 185-1 is shown in a curvilinear plot of numbers of listeners to the episode over time, with respect to media content aired during the episode, viz., a portion 175A-1 including introduction to the episode, a portion 175B-1 including discussions of United States history, a portion 175C-1 including grunge music, a portion 175D-1 including an interview with a college basketball coach, a portion 175E-1 including discussions of college basketball, and a portion 175F-1 including a closing to the episode.

As is shown in FIG. 1C, a machine learning model 160 is trained using the attributes 115-1 of the creator 110-1 and the attributes 135-1 of the media program as training inputs, and the data 185-1 regarding listenership to the media program as training outputs. The model 160 may be any machine learning algorithm, system or technique, such as an artificial neural network, e.g., a feedforward neural network or a recurrent neural network, and may be fully or partially connected. The model 160 may be trained in a supervised or unsupervised manner, or in any other manner, e.g., to generate an output 165-1 that is most closely proximate the data 185-1 regarding the listenership at times during the episode of the media program. Although FIG. 1C shows the model 160 being trained based on a single set of attributes 115-1, 135-1 regarding the creator 110-1 and the media program, and a single set of data 185-1 regarding listenership to a single episode of the media program, those of ordinary skill in the pertinent arts will recognize that the model 160 may be trained based on any number of sets of attributes of creators or media programs and corresponding data regarding listenership to episodes of such media programs in accordance with implementations of the present disclosure.

Figure 1D:
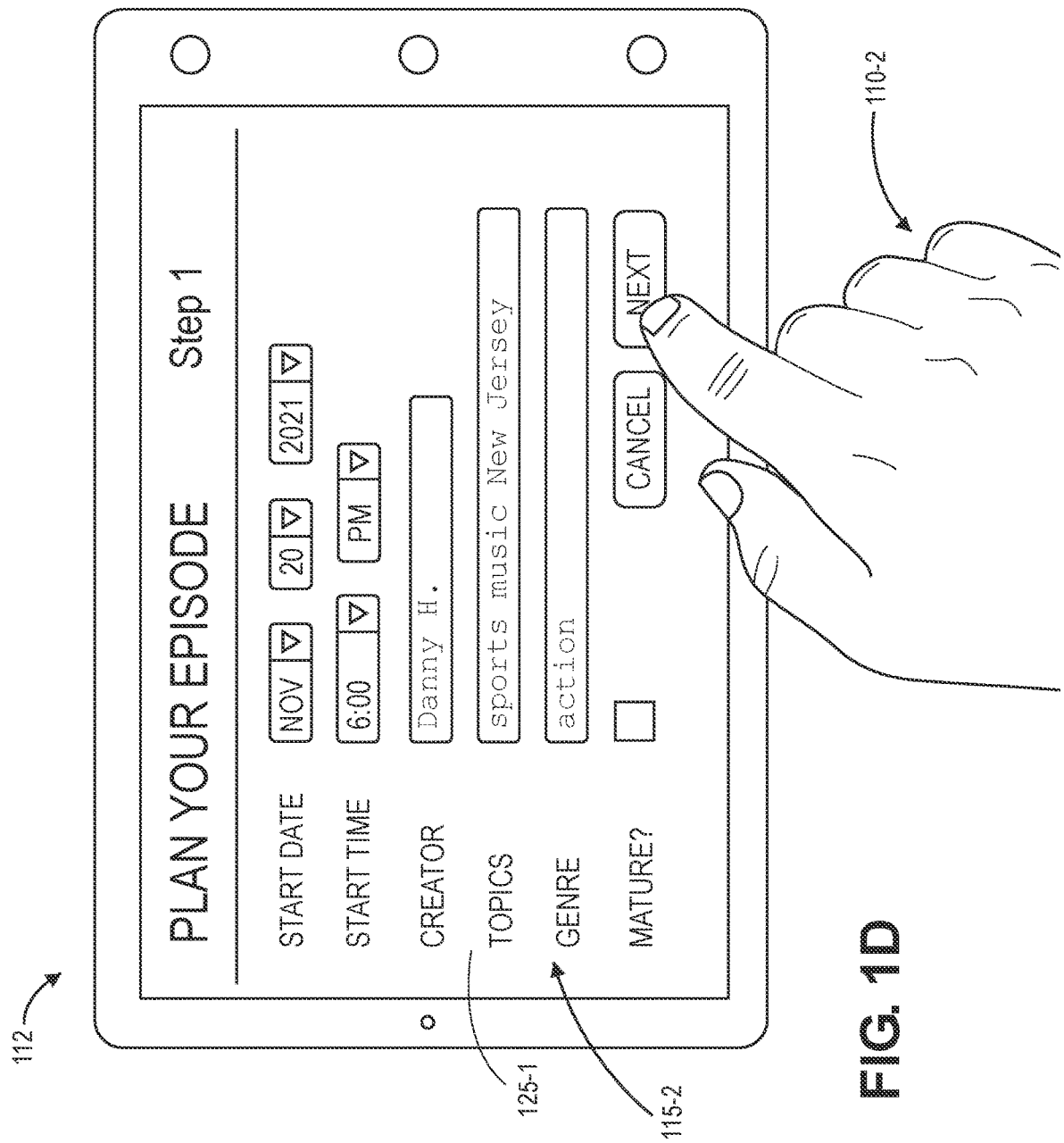

Once the model 160 is adequately trained, the model 160 may be used by a creator as an aid in planning an episode of a media program, e.g., to identify times at which advertisements should be aired during the episode, or durations of the advertisements. As is shown in FIG. 1D, a creator 110-2 provides information (or data) 115-2 regarding himself or herself via a user interface 125-1 rendered by a mobile device 112 (or another computer system). The information 115-2 includes a date and a time on which an episode is scheduled to begin, a name of the creator 110-2, and topics that the creator 110-2 intends to discuss during the episode. The information 115-2 further includes a genre of the media program, and whether the media program should be restricted to mature audiences only. In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features, for receiving information or data of any type or form from the creator 110-2.

Figure 1E:
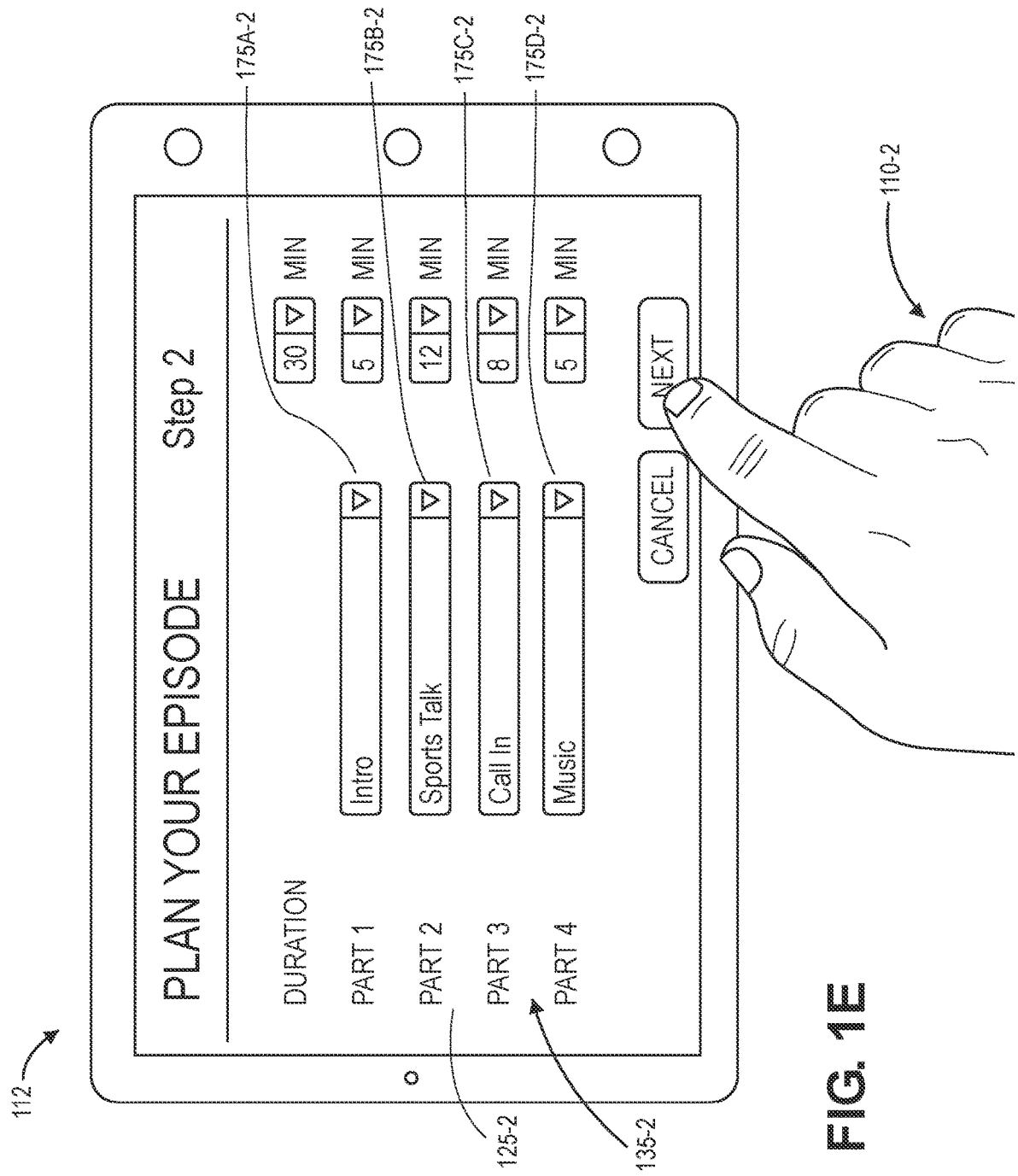

As is shown in FIG. 1E, the creator 110-2 provides additional information (or data) 135-2 regarding the episode, including a predicted duration of the episode, viz., thirty minutes, as well as identifiers of media content that the creator 110-2 intends to include in the episode. For example, as is shown in FIG. 1E, the creator 110-2 has indicated that the episode will include a five-minute introductory period, a twelve-minute period of talk or other commentary regarding sports, an eight-minute period during which listeners may participate in the episode, and a five-minute period during which the creator 110-2 intends to play music (e.g., songs or other media entities).

Figure 1F:
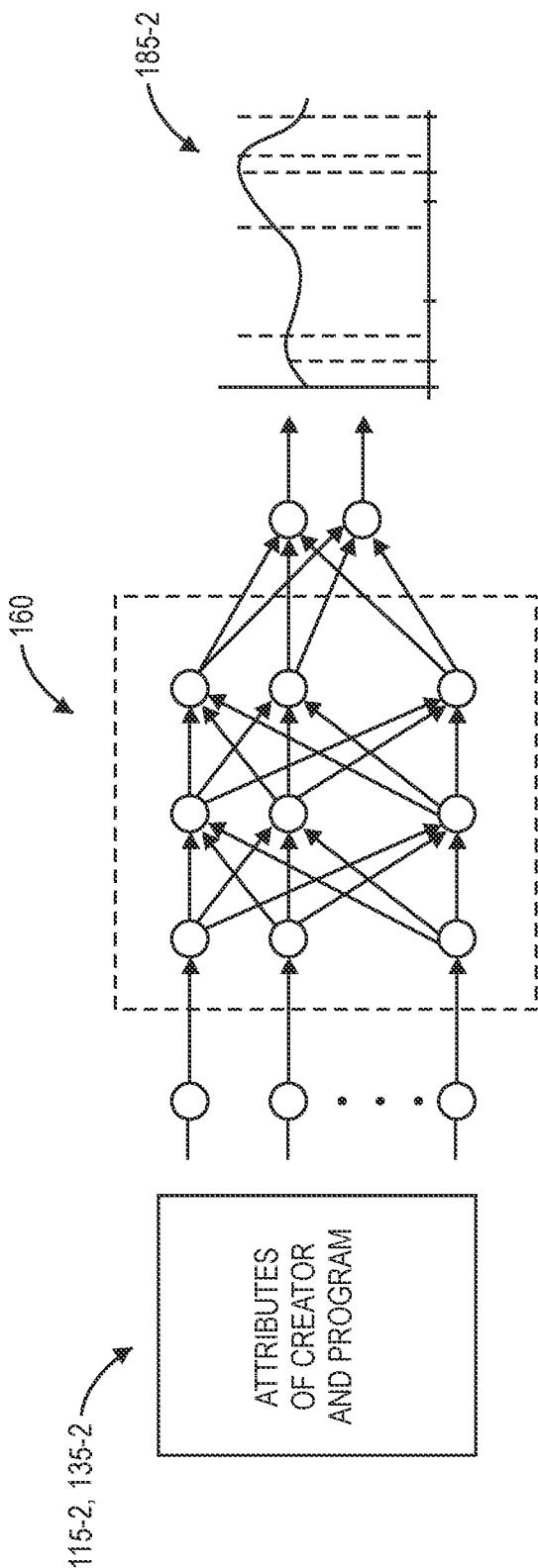

As is shown in FIG. 1F, after the information 115-2, 135-2 has been received from the creator 110-2 by way of the user interfaces 125-1, 125-2, the information 115-2, 135-2 may be provided as inputs to the model 160, and data 185-2 representing predicted listenership during the episode may be generated based on outputs received from the model 160. For example, once the model 160 is trained to associate attributes of creators or media programs with listenership, as is shown in FIG. 1C, the data 185-2 may be predicted based on outputs received in response to inputs including the information 115-2, 135-2.

Figure 1G:
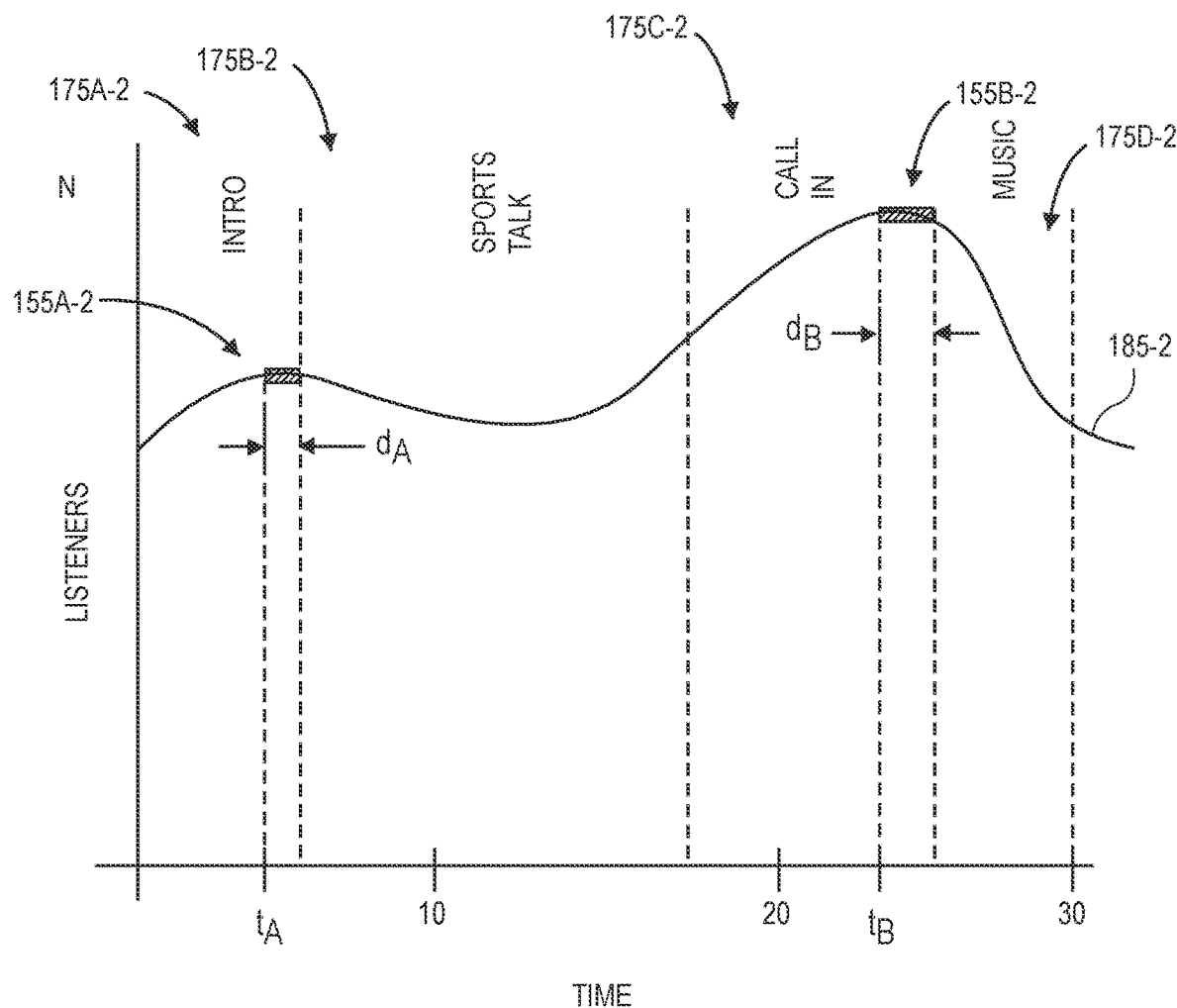

As is shown in FIG. 1G, the data 185-2 represents numbers of listeners that are predicted at times during the episode that are shown, depicted or represented in a curvilinear plot on a Cartesian plane, viz., with the numbers of listeners shown along an ordinate and times during the episode shown along an abscissa. The data 185-2 is also shown with respect to the portions 175A-2, 175B-2, 175C-2, 175D-2 of media content that the creator 110-2 intends to include in the episode of the media program.

Additionally, slots (or portions or sections) of the episode during which airing one or more advertisements is recommended or encouraged, e.g., times and durations of such advertisements, are also shown with respect to the data 185-2. For example, a first slot 155A-2 for airing an advertisement at a time $t_A$ and for a duration $d_A$ during the episode, and a second slot 155B-2 for airing an advertisement at a time $t_B$ and for a duration $d_B$ during the episode, are shown in FIG. 1G. The times $t_A$, $t_B$ and the durations $d_A$, $d_B$ of the slots 155A-2, 155B-2 may be selected in any manner and on any basis with respect to the data 185-2. For example, in some implementations, the times $t_A$, $t_B$ of the slots 155A-2, 155B-2 may be selected to correspond with local or absolute maximum numbers of listeners during the episode, to maximize a price that the slots 155A-2, 155B-2 may be offered to manufacturers, merchants, sellers or vendors of goods or services for airing advertisements, or to maximize a value of advertisements aired during the slots 155A-2, 155B-2 to such manufacturers, merchants, sellers or vendors. Alternatively, or additionally, the times $t_A$, $t_B$ of the slots 155A-2, 155B-2 may be selected to correspond with a beginning of the episode, an end of the episode, a midpoint of the episode, or any other time during the episode. In some implementations, the durations $d_A$, $d_B$ of the slots 155A-2, 155B-2 may be selected to be long enough to include or accommodate a valuable, substantive advertisement for one or more goods or services, but brief enough to ensure that only a limited number of listeners may be expected to lose interest in the episode during the advertisement. For example, in some implementations, the durations $d_A$, $d_B$ of the slots 155A-2, 155B-2 may be selected to correspond with times at which listenership is expected to remain stable or increase, or a time at an inflection point of listenership, based on outputs received from the model 160, or on any other basis.

Figure 1H:
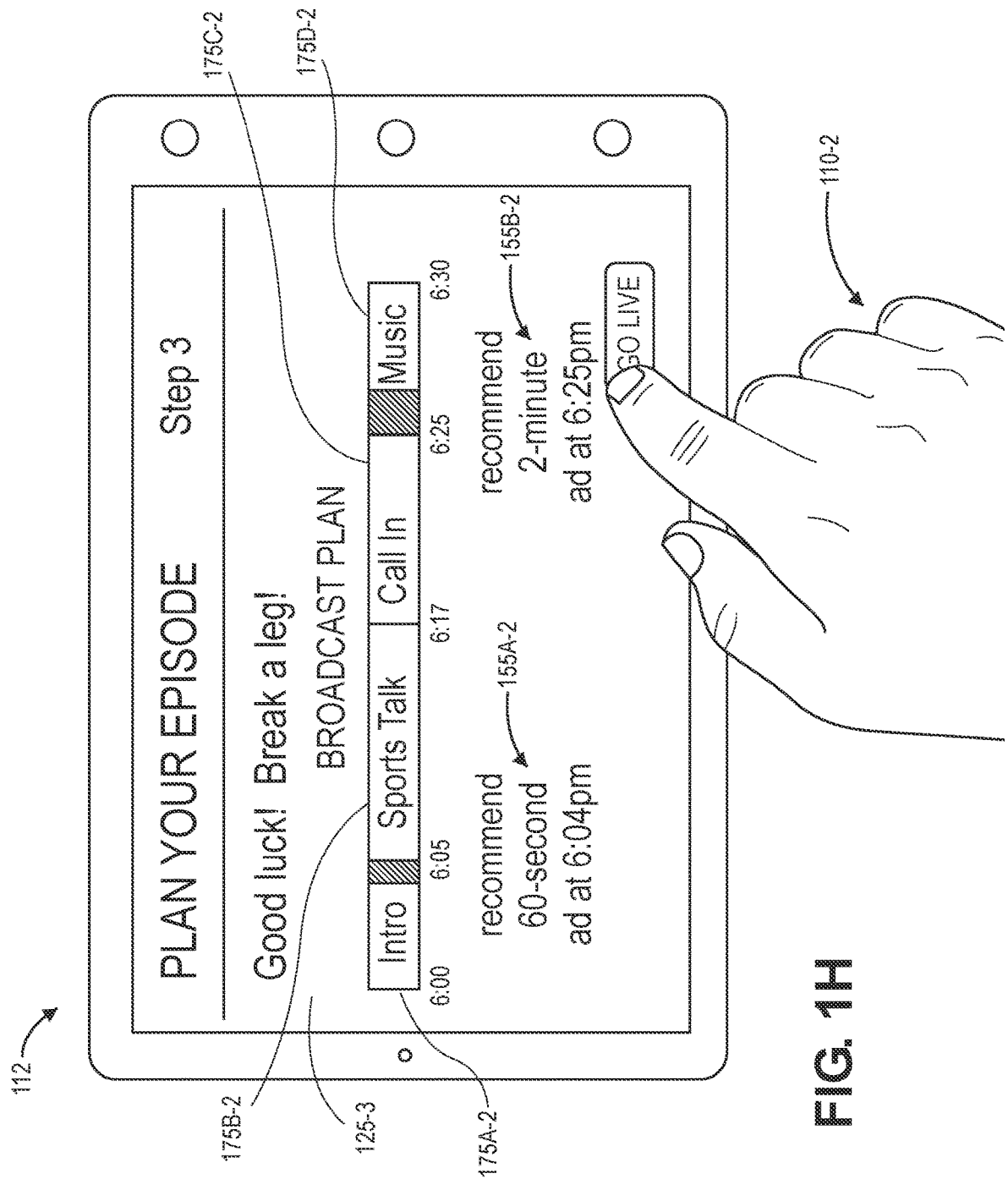

As is shown in FIG. 1H, information regarding a broadcast plan for the episode is shown in a user interface 125-3 rendered by the mobile device 112. The user interface 125-3 includes words or sets of text directed to the creator 110-2, as well as a visual representation of the media content that the creator 110-2 intends to include in the episode, viz., the portions 175A-2, 175B-2, 175C-2, 175D-2. The user interface 125-3 also includes information regarding the slots 155A-2, 155B-2 during which the creator 110-2 is recommended or encouraged to air one or more advertisements, e.g., the times $t_A$, $t_B$ and for the durations $d_A$, $d_B$ shown in FIG. 1G. The user interface 125-3 further includes a button or another selectable feature that may be selected or activated by the creator 110-2 in order to begin airing the episode of the media program. For example, upon selecting or activating the button or the other selectable feature, one or more connections (e.g., a two-way communication channel) may be established between the mobile device 112 and a control system or another computer device or system for airing the media program, and one or more connections (e.g., one-way communication channels) may be established between the control system or the other computer device or system and devices of listeners. Content generated or selected by the creator 110-2 using the mobile device 112 may then be transmitted to the mobile device 112 and devices of such listeners, either spontaneously or in accordance with the broadcast plan.

Accordingly, slots (or portions or sections) of an episode of a media program during which the airing of advertisements is recommended may be identified or selected in an effort to maximize revenues received from such advertisements while minimizing the impact of such advertisements on listenership to the episode, e.g., by training a model using information or data representing attributes of creators and attributes of media programs, and information or data regarding listenership or listener interactivity during episodes of the media programs, to predict information or data regarding listenership or listener interactivity during an episode of a media program. The predicted information or data regarding the listenership or the listener interactivity of the episode of the media program may then be used to identify times during the episode when advertisements may be most effectively aired, or durations of such advertisements, to minimize a level of risk that listeners to the media program will be lost during the advertisements, while maximizing the revenues received from such advertisements. The slots during an episode of a media program (e.g., times or durations for which advertisements may be preferentially aired) may then be provided to the creator, either when the creator is planning the episode, or while the episode is in progress. During the episode, the creator may then air advertisements during the episode at the recommended times or for the recommended durations of the slots, or at other times or for other durations, e.g., in different slots. Additionally, during the episode, new or different slots may be identified, or recommended times or durations of advertisements may be revised, based on observed changes in the listenership or listener interactivity, and the model may be trained or otherwise updated accordingly.

In a live broadcasting environment, such as systems or methods for transmitting content generated by creators to any number of listeners, e.g., over one or more networks, a creator is often granted broad discretion to generate content of nearly any type, at any time, and for any duration, and may thereby have a direct influence on a number of listeners that listen to the media programs, or on how long such listeners remain engaged with the media programs. Many creators are neither technologically skilled nor business-savvy, however, and cannot effectively determine when to insert an advertisement into their media programs, or for how long the advertisement should air. Although advertising is a primary source of revenue for broadcast programs, many operators of such programs, including creators of user-generated content, often have difficulty in selecting times or durations of advertisements during their programs, and determining a best time or a best duration for an advertisement during any given episode of any given program is subject to a variety of dynamic factors.

As used herein, the term "listenership" may refer to listeners, or a number of such listeners, e.g., an audience, who are listening to an episode of a media program then being aired. The term "listenership" may also refer to attributes of such listeners, e.g., locations of such listeners, demographics of such listeners, or any other information or data regarding such listeners.

As used herein, the term "media entity" may refer to media content of any type or form (e.g., audio and/or video) that may be recorded, stored, maintained or transmitted in one or more files, such as a movie, podcast, a song (or title), a television show, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

Media content that may be included in a media program includes, but need not be limited to, one or more media entities from a music catalog, repository or streaming service, one or more advertisements of items, goods or services, or one or more news, sports or weather programs, which may be live or previously recorded, as well as voices of a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit the media program over digital channels (e.g., web-based or application-based), to any number of systems or devices of any form.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called Web Socket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific media entity, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
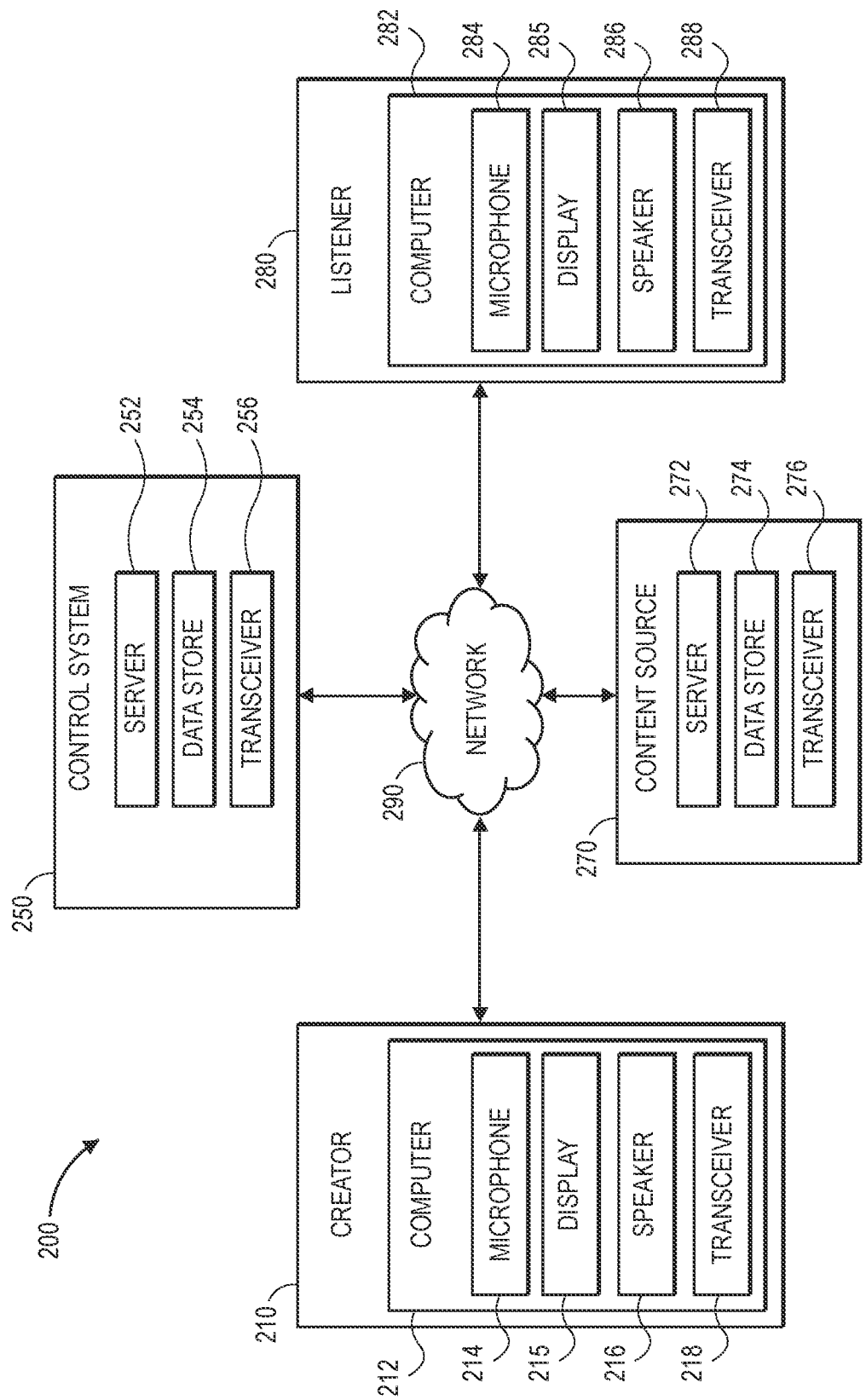
FIGS. 2A and 2B are block diagrams of components of one system for selecting times or durations of advertisements in accordance with embodiments of the present disclosure.
Figure 2B:
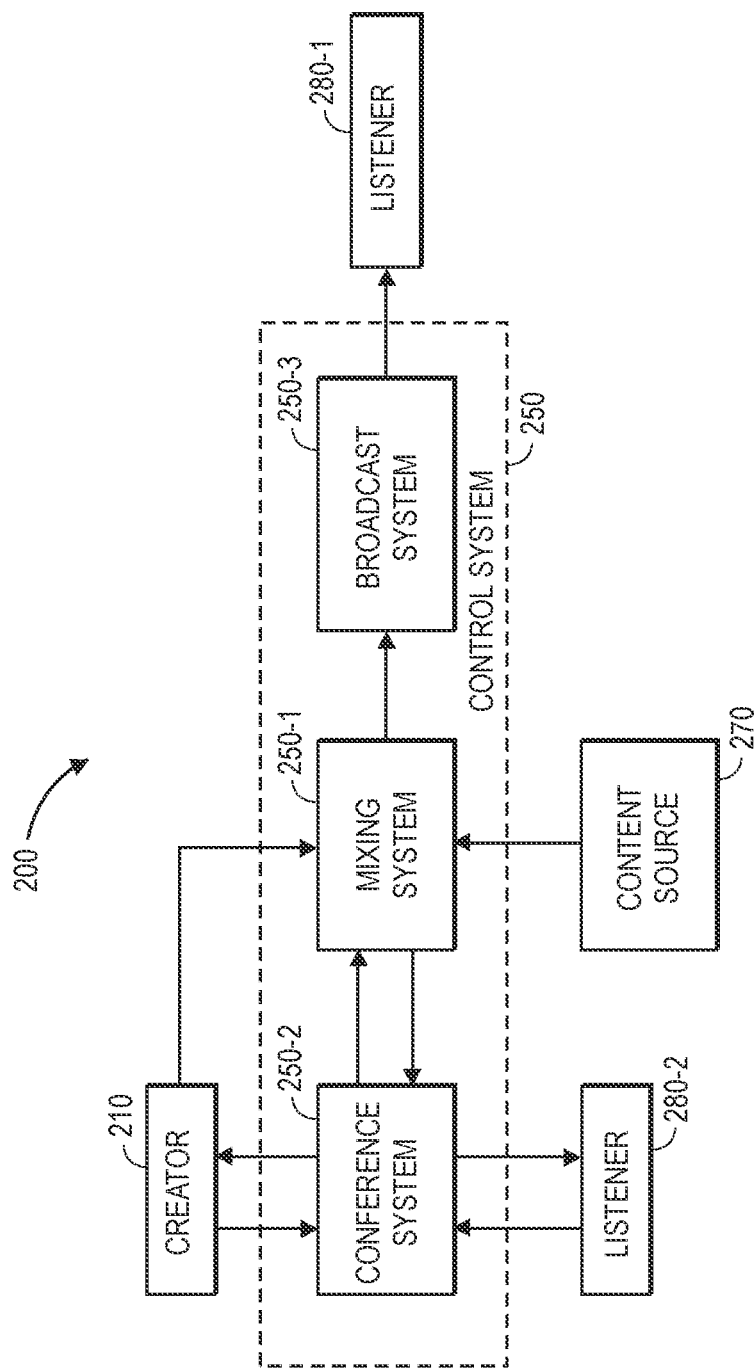

Referring to FIGS. 2A and 2B, block diagrams of components of one system 200 for selecting times or durations of advertisements in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1H.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributes or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
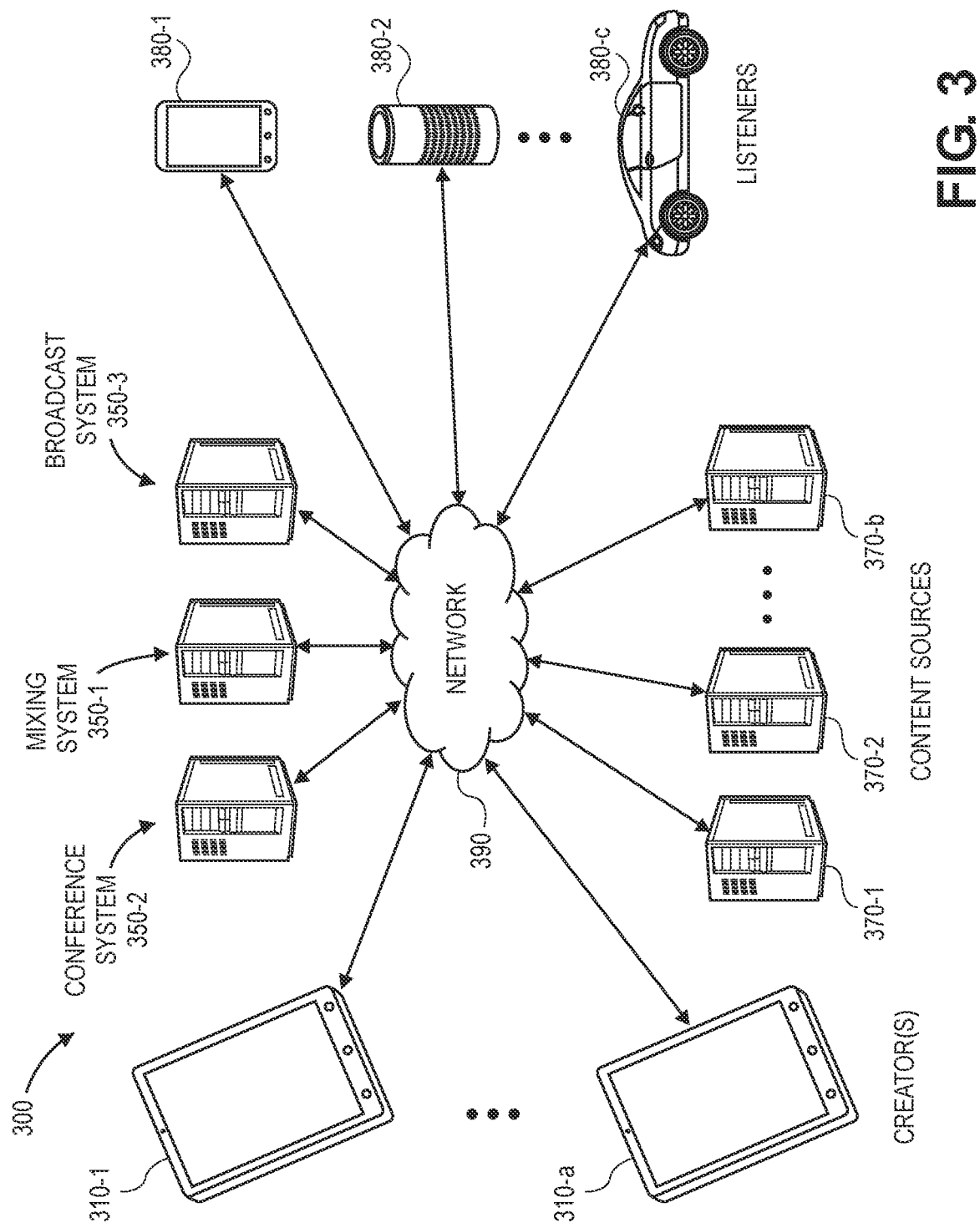
FIG. 3 is a view of aspects of one system for selecting times or durations of advertisements in accordance with embodiments of the present disclosure.

Referring to FIG. 3, a view of aspects of one system for monitoring live broadcasts in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1H. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-a may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-a, or any of the listeners 380-1, 380-2 . . . 380-c, e.g., by way of the conference system 350-2, or from any of the media sources 370-1, 370-2 . . . 370-b over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-c, in accordance with a broadcast plan (or a sequence of media content, or another schedule), or at the direction of the creators 310-1 . . . 310-a. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-a.

In some implementations, the mixing system 350-1 may receive media content from one or more of the media sources 370-1, 370-2 . . . 370-b, and cause the media content to be transmitted to one or more of the creators 310-1 . . . 310-a or the listeners 380-1, 380-2 . . . 380-c by the broadcast system 350-3. In some other implementations, the mixing system 350-1 may receive media content from one or more of the media sources 370-1, 370-2 . . . 370-b, and mix, or combine, the media content with any media content received from the creators 310-1 . . . 310-a or any of the listeners 380-1, 380-2 . . . 380-c, before causing the media content to be transmitted to one or more of the creators 310-1 . . . 310-a or the listeners 380-1, 380-2 . . . 380-c by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-b, e.g., cameras and/or microphones provided at a location of a sporting event, or any other event, and mix that media content with any media content received from any of the creators 310-1 . . . 310-a or any of the listeners 380-1, 380-2 . . . 380-c. In such embodiments, the creators 310-1 . . . 310-a may act as sportscasters, news anchors, weathermen, reporters or others, and may generate a media program that combines audio or video content captured from a sporting event or other event of interest, along with audio or video content received from one or more of the creators 310-1 . . . 310-a or any of the listeners 380-1, 380-2 . . . 380-c before causing the media program to be transmitted to the listeners 380-1, 380-2 . . . 380-c by the conference system 350-2 or the broadcast system 350-3.

In some implementations, the conference system 350-2 may establish two-way communications channels between any of the creators 310-1 . . . 310-a and, alternatively, any of the listeners 380-1, 380-2 . . . 380-c, who may be invited or authorized to participate in a media program, e.g., by providing media content in the form of spoken or sung words, music, or any media content, subject to the control or discretion of the creators 310-1 . . . 310-a. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-a. In some implementations, the mixing system 350-1 may effectively act as a virtual participant in such a conference, by transmitting media content received from any of the media sources 370-1, 370-2 . . . 370-b to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-c.

Likewise, the broadcast system 350-3 may be any server or other computer system or device configured to receive information or data from the mixing system 350-1, or transmit any information or data to any of the listeners 380-1, 380-2 . . . 380-c over the network 390. In some implementations, the broadcast system 350-3 may establish one-way communications channels with the mixing system 350-1 or any of the listeners 380-1, 380-2 . . . 380-c in accordance with a broadcast plan (or a sequence of media content, or another schedule), or at the direction of the creators 310-1 . . . 310-a. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-a.

The content sources 370-1, 370-2 . . . 370-b may be servers or other computer systems having media content stored thereon, or access to media content, that are configured to transmit media content to the creators 310-1 . . . 310-a or any of the listeners 380-1, 380-2 . . . 380-c in response to one or more instructions or commands from the creators 310-1 . . . 310-a or the mixing system 350-1. The media content stored on or accessible to the content sources 370-1, 370-2 . . . 370-b may include one or more advertisements, songs or media files, news programs, sports programs, weather reports or any other media files, which may be live or previously recorded. The number of content sources 370-1, 370-2 . . . 370-b that may be accessed by the mixing system 350-1, or the types of media content stored thereon or accessible thereto, is not limited.

The listeners 380-1, 380-2 . . . 380-c may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-a, with any of the content sources 370-1, 370-2 . . . 370-b, or with any of the listeners 380-1, 380-2 . . . 380-c, as necessary, to compile and seamlessly transmit media programs over digital channels (e.g., web-based or application-based), to devices of the creators 310-1 . . . 310-a or the listeners 380-1, 380-2 . . . 380-c in accordance with a broadcast plan, or subject to the control of the creators 310-1 . . . 310-a. Furthermore, in some implementations, one or more of the listeners 380-1, 380-2 . . . 380-c, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-c, the mixing system 350-1 may terminate one of the one-way channels with one of the listeners 380-1, 380-2 . . . 380-c, and cause the conference system 350-2 to establish a two-directional channel with that listener, thereby enabling that listener to not only receive but also transmit media content to the creators 310-1 . . . 310-a or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
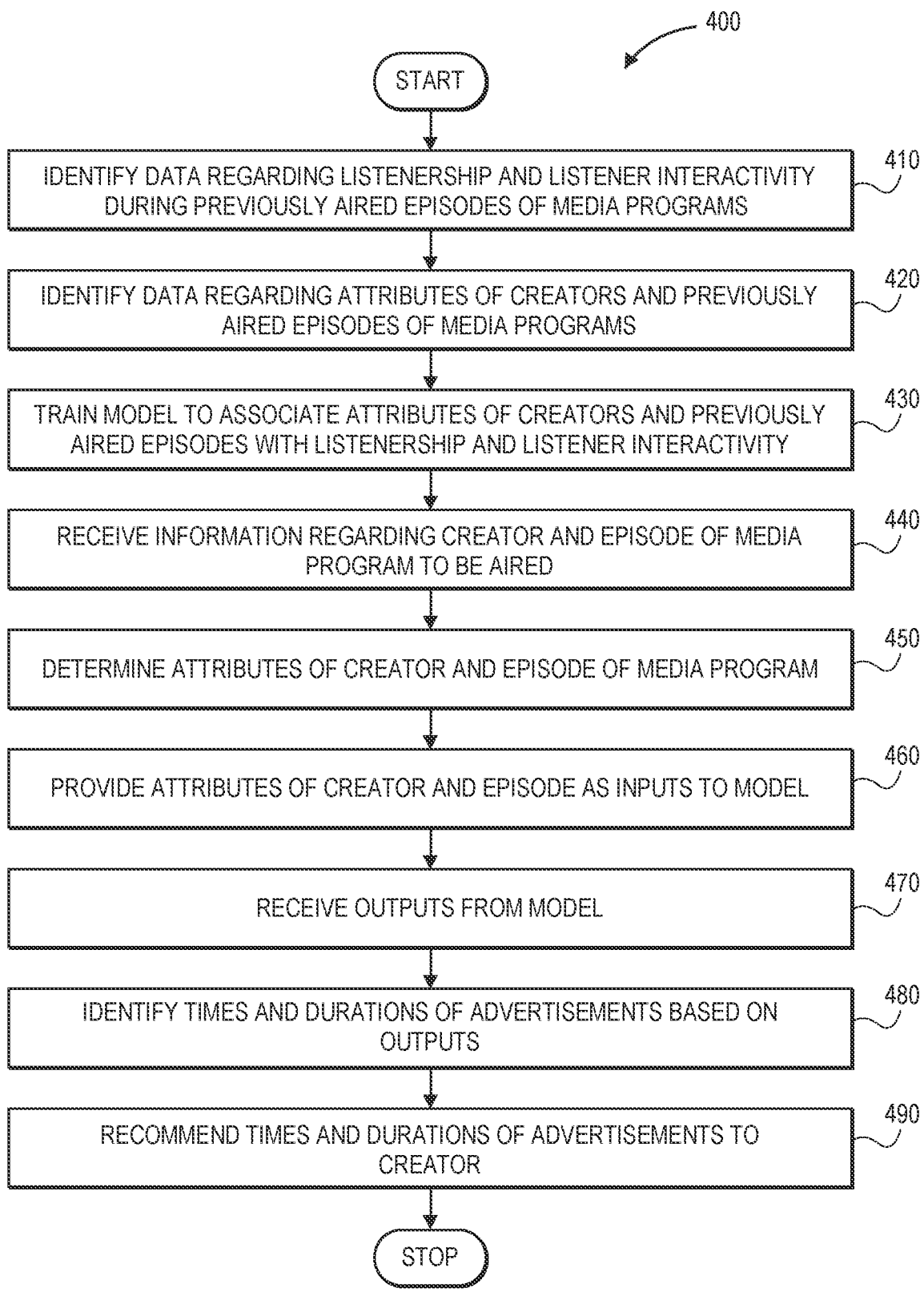
FIG. 4 is a flow chart of one process for selecting times or durations of advertisements in accordance with embodiments of the present disclosure.

Referring to FIG. 4, a flow chart 400 of one process for selecting times or durations of advertisements in accordance with embodiments of the present disclosure is shown.

At box 410, data regarding listenership and listener interactivity during one or more previously aired episodes of media programs is identified. In some implementations, the data may identify or refer to numbers of listeners, as well as when such listeners began or finished listening to the previously aired episodes, or portions of the episodes to which the listeners listened. The data may also identify or refer to devices or systems from which the listeners downloaded or received the previously aired episodes, e.g., a mobile device such as a tablet computer or a smartphone, a traditional computer such as a desktop or a laptop, an in-home device such as a smart speaker, a television, or a media player, a wearable device such as a wrist watch or ear phones (or ear buds), or any other device or system.

The data may further identify any interactions received from listeners during the playing of such episodes. For example, the data may identify any actions by a listener to play or pause an episode of a media program, or to fast-forward or rewind the episode of the media program. Alternatively, the data may identify any actions by a listener to generate, send or read a chat message to or from any creator, listener or other user of the media program. The data may identify any actions by listeners to join an episode of a media program, and such actions may be processed or interpreted to determine that the listener is interested in media content of the media program, or efforts to stop the playing of an episode of a media program, search for another media program, or end the playing of media altogether either permanently or for a period of time, which may be processed or interpreted to determine that the user is uninterested in the episode of the media program at the given time. The data may identify any interactions by listeners with interactive features having symbols representative of emotions or opinions, which may be interpreted to determine emotions or opinions of such listeners regarding media content of an episode of the media program.

At box 420, data regarding attributes of creators and the previously aired episodes of the media programs is identified. For example, the attributes of the creators may identify or represent ages of the creators, as well as their respective experience in generating or producing media programs, and levels of education or occupational histories (e.g., whether the creator has any experience in a field or area associated with the theme or topic of a media program, such as a former athlete turned sportscaster, a former elected official turned political commentator, a singer or producer commenting on music, or the like). The attributes of the creators may further identify or represent genres, topics or other content or features that the creators are known or have been observed to generate or produce, or genres, topics or other content or features of the previously aired episodes.

The attributes of the episodes may include times or dates on which such episodes were aired, as well as durations of the respective episodes, and media content included in such episodes, e.g., audio data representing advertisements, music, news, sports, weather, or other programming, as well as words that are spoken or sung by a creator, a guest, a listener, or any participant in the media program. The attributes of the episodes may also identify any sentiments, topics, attitudes, intentions, urgencies, emotions, or others of the media program in general, or of the episode in particular.

The attributes of the episodes may further include ratings of such episodes, including but not limited to maturity ratings (e.g., whether such episodes include content geared for children, teens, adults, or the elderly), quality ratings (e.g., qualitative or quantitative ratings that may represent a quality of the media program as rated by listeners or other authorities in numbers, stars or other features), or any other type or form of evaluation of the episodes.

At box 430, a model is trained to associate the attributes of the creators and the previously aired episodes with listenership and listener interactivity based on the data identified at box 410 and the data identified at box 420. For example, in some implementations, the model may be a machine learning algorithm, system or technique, such as an artificial neural network having an input layer, an output layer and one or more hidden layers that may operate subject to various activation functions defined with respect to nodes in each of such layers. The artificial neural network may be of any type or form, such as a feedforward neural network or a recurrent neural network, and may be fully or partially connected. In a feedforward neural network, e.g., a convolutional neural network, information may specifically flow in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers may be connected to all of the neurons in a subsequent layer. By contrast, in a sparsely connected neural network architecture, the number of activations of each of the neurons is limited, such as by a sparsity parameter.

Moreover, the model may be trained in a supervised or unsupervised manner. In supervised learning, the model may be trained by a training set comprising at least one input of the data regarding the creators and the episodes and at least one target output of the data regarding the listenership or the listener interactivity for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. In some implementations, the model may be trained by back propagation to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure.

In some other implementations, the model may be a gradient-based model, a tree-based model, a learning model, a random forest, a gradient-boosting tree, or others. In still other implementations, the model may be a transformer (e.g., a bidirectional encoder representation from transformers).

Those of ordinary skill in the pertinent art would recognize that any algorithm or method may be used to train one or more layers of a model or another network. Likewise, any algorithm or method may be used to determine and minimize errors in an output of such a model. Additionally, those of ordinary skill in the pertinent art would further recognize that the various layers of a model (e.g., a neural network) may be trained collectively, such as in a sparse autoencoder, or individually, such that each output from one hidden layer of the neural network acts as an input to a subsequent hidden layer.

At box 440, information regarding a creator and an episode of a media program to be aired is received. For example, the information may be received from a device or system associated with the creator, such as by one or more entries of text or other information or data via a user interface provided on the device or system. The text or other information or data may identify the creator, as well as a preliminary or initial schedule of media content to be aired during the episode of the media program, including but not limited to one or more identifiers of songs or other media entities that the creator intends to air during the episode, one or more identifiers of guests, listeners or other individuals that the creator intends to invite to participate in the episode, or one or more other features of the episode.

At box 450, attributes of the creator and the episode of the media program are determined. For example, the attributes may include or identify an age of the creator, a level of experience of the creator in other media programs, a level of education or an occupational history of the creator, or any genres, topics or other content or features that the creator is expected to generate or produce, or genres, topics or other content or features that are expected to be included in the episode. The attributes of the episode may further include a time or a date on which the episode is expected to air, as well as an anticipated duration of the episode, and media content that is expected to be included in the episode. The attributes of the episode may also include any sentiments, topics, attitudes, intentions, urgencies, emotions, or others that the episode is expected to include, as well as a rating of the episode, or any other type or form of evaluation of the episode.

At box 460, the attributes of the creator and the episode of the media program are provided as inputs to the model that was trained at box 430, and at box 470, one or more outputs are received from the model, in response to the inputs. For example, once the model has been trained to recognize dominant characteristics of an input of a training set, e.g., to associate a point or a set of data regarding creators or episodes with a point or a set of data regarding listenership or listener interactivity, to within an acceptable tolerance, an input in the form of an attribute of the creator or an attribute of the media program may be provided to the trained model, and an identifier representative of listenership to the episode, or listener interactivity with the episode, may be identified based on the output thereof.

At box 480, times at which advertisements are to be aired during the episode, and durations of such advertisements, are identified based on the outputs received at box 470. For example, times at which a number of listeners to the episode is expected to be substantially high or at a maximum number or level, as well as times at which listeners are deemed most likely to remain engaged with the episode in the event that one or more advertisements are aired. For example, where the model is properly trained based on the data regarding listenership and listener interactivity during one or more previously aired episodes of media programs identified at box 410 and the data regarding attributes of creators and the previously aired episodes of the media programs identified at box 420, the outputs received at box 470 may indicate predicted listenership or listener interactivity information or data at various times during the episode. In some implementations, data regarding predicted listenership or listener interactivity during the episode may be identified based on the outputs and plotted or represented in any form. The data may then be differentiated, integrated or processed in any other manner to identify local or absolute maximum or minimum values of listeners or listener interactivity, as well as any inflection points. Slots (or periods or sections) of an episode, e.g., times or durations of the episode during which the airing of one or more advertisements is recommended, may be identified or selected in any manner and based on any threshold levels of listenership, or listener interactivity, which may be determined or predicted based on outputs received from the model with respect to such maximum or minimum values or inflection points, or on any other basis.

At box 490, the times and the durations of the advertisements identified at box 480 are recommended to the creator, and the process ends. For example, information or data regarding slots during which advertisements may be preferentially aired (e.g., times or durations of such advertisements) may be communicated to a creator in any manner, such as while the creator is developing a broadcast plan for the episode of the media program, or while the media program is in progress. Alternatively, or additionally, the slots of the advertisements may be identified or updated during the episode, e.g., in real time or near-real time.

Figure 5:
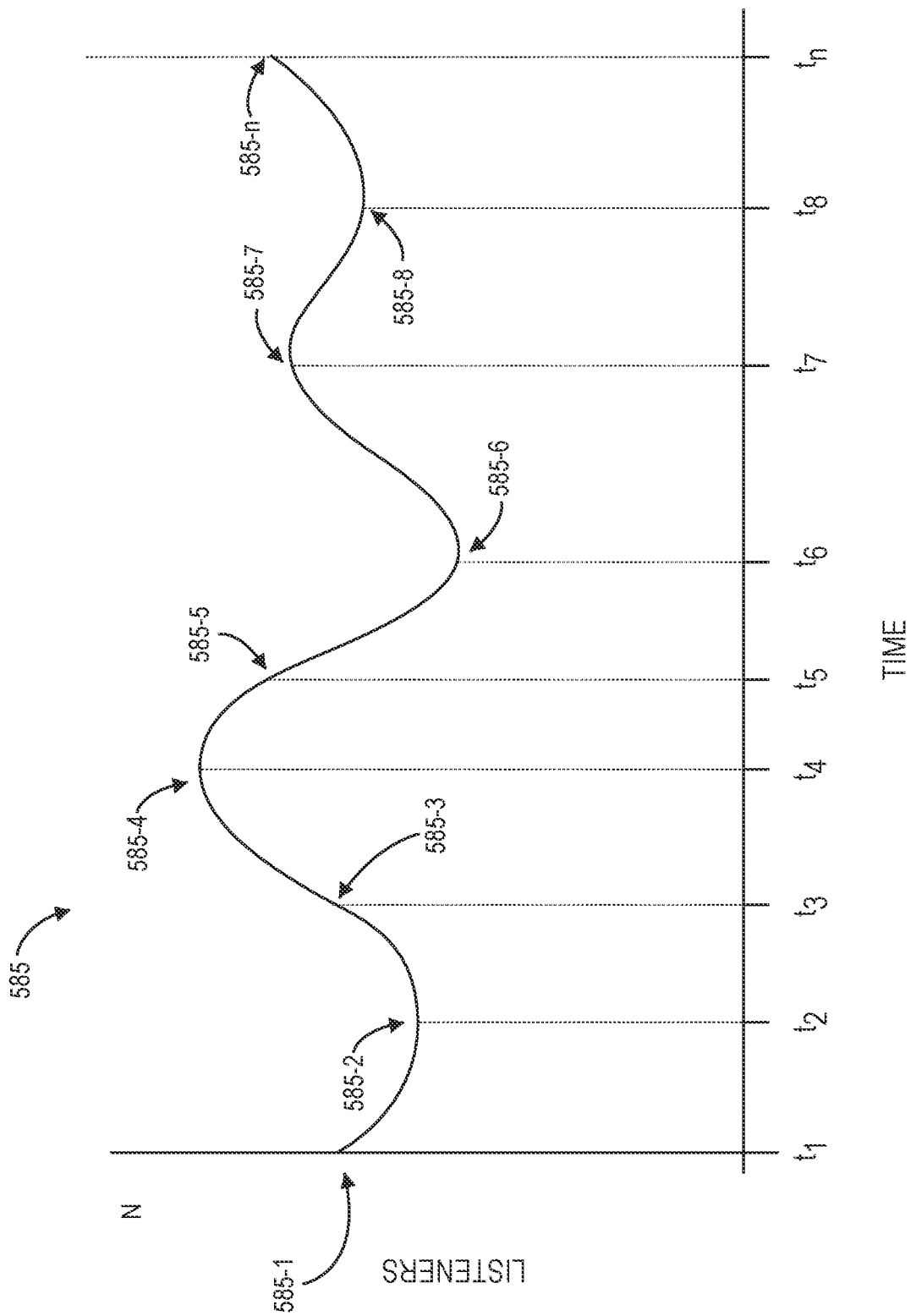
FIG. 5 is a view of aspects of one system for selecting times or durations of advertisements in accordance with embodiments of the present disclosure.

Slots (or periods or sections) of episodes for airing advertisements may be identified and recommended to creators based on any information or data regarding actual or predicted listenership at such times, including whether numbers of listeners are at maximum or minimum levels at such times, or are increasing or decreasing at such times. Referring to FIG. 5, a view of aspects of one system for selecting times or durations of advertisements in accordance with embodiments of the present disclosure is shown. Except where otherwise noted, reference numerals preceded by the number "5" shown in FIG. 5 indicate components or features that are similar to components or features having reference numerals preceded by the number "3" shown in FIG. 3, by the number "2" shown in FIG. 2A or FIG. 2B or by the number "1" shown in FIGS. 1A through 1H.

As is shown in FIG. 5, data 585 representing listenership during an episode of a media program is shown. The data 585 may represent numbers of listeners that are actively listening to an episode of a media program that is in progress, which may be determined or tracked by monitoring connections or communications channels established with devices of such listeners or in any other manner, or numbers of listeners that may be predicted to listen to an episode of a media program that has yet to air, which may be generated based on outputs received from a machine learning model in response to inputs including one or more attributes of a creator or the media program. As is shown in FIG. 5, the data 585 is depicted or represented in a curvilinear plot on a Cartesian plane, viz., with the numbers of listeners shown along an ordinate and times during the episode shown along an abscissa.

A slot (or a period or a section) of an episode of a media program during which an advertisement may be preferentially aired may be identified and selected based on any aspect of the data 585. For example, a creator may be encouraged to air an advertisement at or near a time 585-1 corresponding to a beginning of the episode, or at or near a time 585-n corresponding to an end of the episode. A creator may also be encouraged to air an advertisement at or near times corresponding to maximum numbers of listeners represented in the data 585, e.g., a time 585-4 corresponding to an absolute maximum number of listeners during the episode, or a time 585-7 corresponding to a local maximum number of listeners during the episode. A creator may be further encouraged to avoid airing any advertisements at or near times corresponding to minimum numbers of listeners represented in the data 585, e.g., a time 585-6 corresponding to an absolute minimum number of listeners during the episode, or times 585-2, 585-8 corresponding to local minimum numbers of listeners during the episode. A creator may also be encouraged, or not encouraged, to air advertisements at times corresponding to inflection points represented in the data 585, e.g., at times 585-3, 585-5. Alternatively, a creator may be encouraged to air an advertisement, or to avoid airing any advertisements, at any times represented in the data 585, which may be selected on any basis.

Listenership during an episode of a media program may be predicted based on outputs received from a model trained to associate attributes of creators or media programs with listenership, e.g., prior to an outset of the episode of the media program, and periodically updated after the episode of the media program has begun. Information regarding actual or predicted numbers of listeners, as well as times or durations of recommended advertisements, may be provided to creators in any manner prior to or during an episode, and the creators may be empowered to determine whether to air an advertisement, or to select an advertisement to be aired during the episode.

Referring to FIGS. 6A through 6L, views of aspects of one system for selecting times or durations of advertisements in accordance with embodiments of the present disclosure are shown. Except where otherwise noted, reference numerals preceded by the number "6" shown in FIGS. 6A through 6L indicate components or features that are similar to components or features having reference numerals preceded by the number "5" shown in FIG. 5, by the number "3" shown in FIG. 3, by the number "2" shown in FIG. 2A or FIG. 2B or by the number "1" shown in FIGS. 1A through 1H.

Figure 6A:
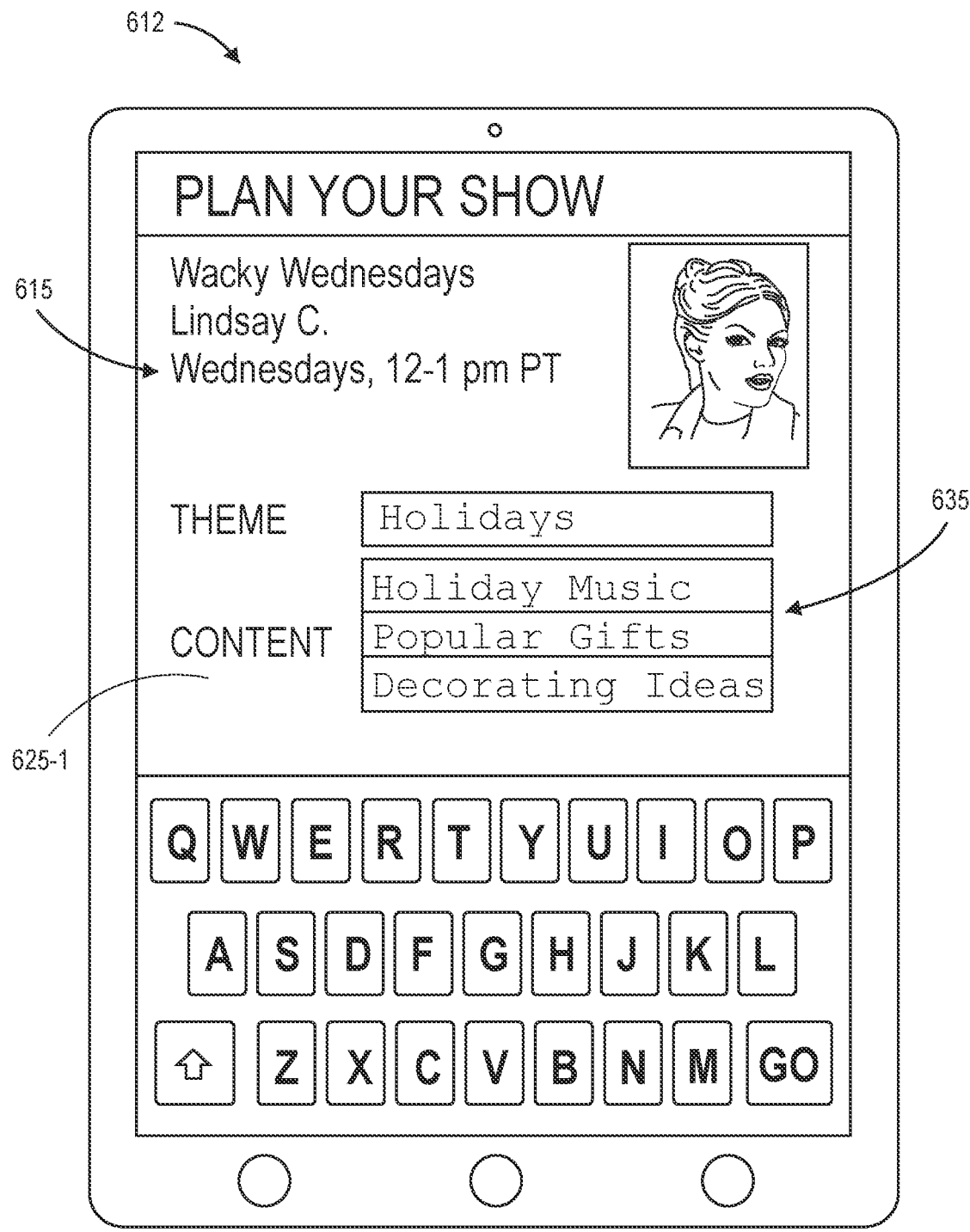

As is shown in FIG. 6A, a mobile device 612 or another computer system of a creator 610 includes a user interface 625-1 rendered on an interactive display 615 of the mobile device 612. The user interface 625-1 identifies information 615 regarding the creator 610, e.g., a name of the creator 610, as well as a title of a media program, and a time and day on which episodes of the media program are scheduled or typically aired. The user interface 625-1 further enables the creator 610 to enter information 635 regarding an upcoming episode of the media program, e.g., a theme of the episode, and to identify content that the creator 610 intends to include during the episode. Some or all of the information 615, 635 may be received directly from the creator 610 via the user interface 625-1, such as by one or more interactions with a virtual keyboard or other aspects of the interactive display 615, or retrieved from one or more computer devices or systems associated with the creator 610, the mobile device 612 or the media program.

Figure 6B:
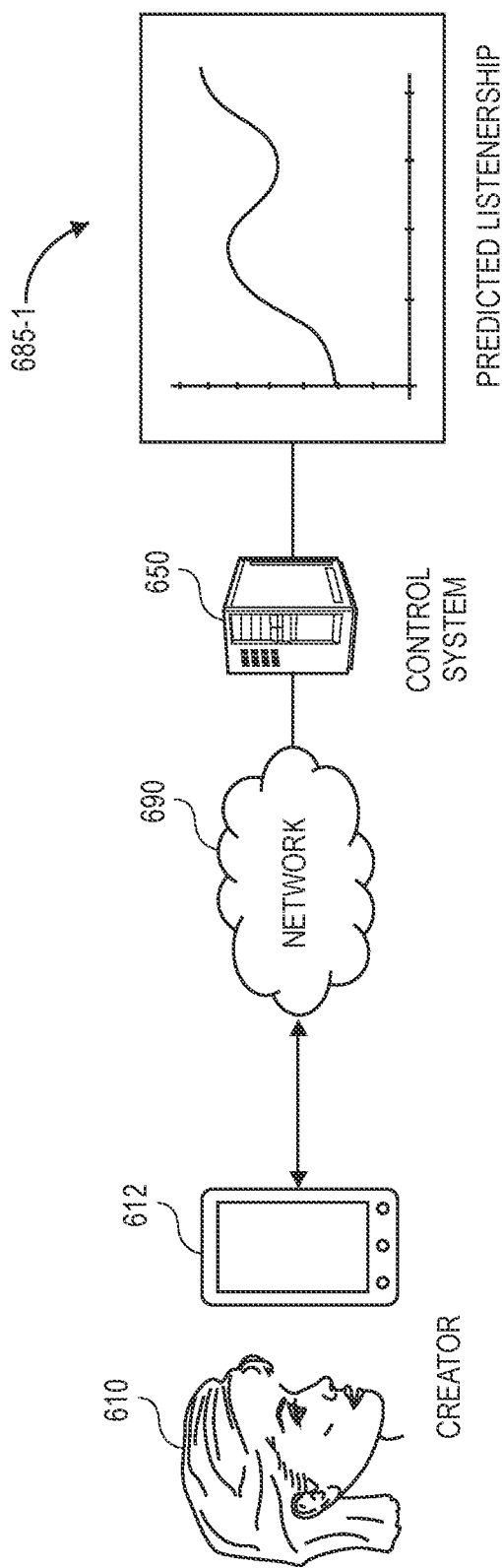

As is shown in FIG. 6B, the information 615, 635 associated with the creator 610 or the media program may be transmitted by the mobile device 612 to a control system 650 for the media program, or to any other computer device or system, over one or more networks 690. The control system 650 may process the information 615, 635 to generate data 685-1 regarding predicted listenership during the episode of the media program, e.g., numbers of listeners at various times during the episode. In some implementations, the information 615, 635, or attributes determined based on the information 615, 635, may be provided as inputs to a model (e.g., a machine learning algorithm, system or technique) that is trained to predict listenership during an episode based on attributes of a creator or a media program. Alternatively, the data 685-1 may be generated in any other manner or by any other technique.

As is shown in FIG. 6C, the data 685-1 represents numbers of listeners that are predicted at times during the episode, e.g., between 12 o'clock and 1 o'clock p.m. The data 685-1 is shown, depicted or represented in a curvilinear plot on a Cartesian plane, viz., with numbers of listeners shown along an ordinate and times during the episode shown along an abscissa.

Additionally, as is also shown in FIG. 6C, a plurality of slots 655A-1, 655B-1, 655C-1 during which the creator 610 is recommended or encouraged to air one or more advertisements are identified based on the data 685-1. In particular, and as is shown in FIG. 6C, times $t_A$, $t_B$, $t_C$ at which the slots 655A-1, 655B-1, 655C-1 begin, and durations $d_A$, $d_B$, $d_C$ of the slots 655A-1, 655B-1, 655C-1, are also shown with respect to the data 685-1. For example, a first slot 655A-1 begins at a time $t_A$ and lasts for a duration $d_A$, while a second slot 655B-1 begins at a time $t_B$ and lasts for a duration $d_B$, and a third slot 655C-1 begins at a time $t_C$ and for a duration $d_C$.

The creator 610 may create a broadcast plan (or another plan) for airing the episode by specifying topics or content that are to be included during the episode at various times. In some implementations, the creator 610 may take some, all or none of the slots 655A-1, 655B-1, 655C-1 into account when creating a broadcast plan, including but not limited to the times $t_A$, $t_B$, $t_C$ or the durations $d_A$, $d_B$, $d_C$. Alternatively, the creator 610 may begin the episode without first creating a broadcast plan, and may rely on or consider the times $t_A$, $t_B$, $t_C$ or the durations $d_A$, $d_B$, $d_C$ of the slots 655A-1, 655B-1, 655C-1 as guidance during the episode, or decline to rely on or consider the times $t_A$, $t_B$, $t_C$ or the durations $d_A$, $d_B$, $d_C$ of the slots 655A-1, 655B-1, 655C-1.

Figure 6D:
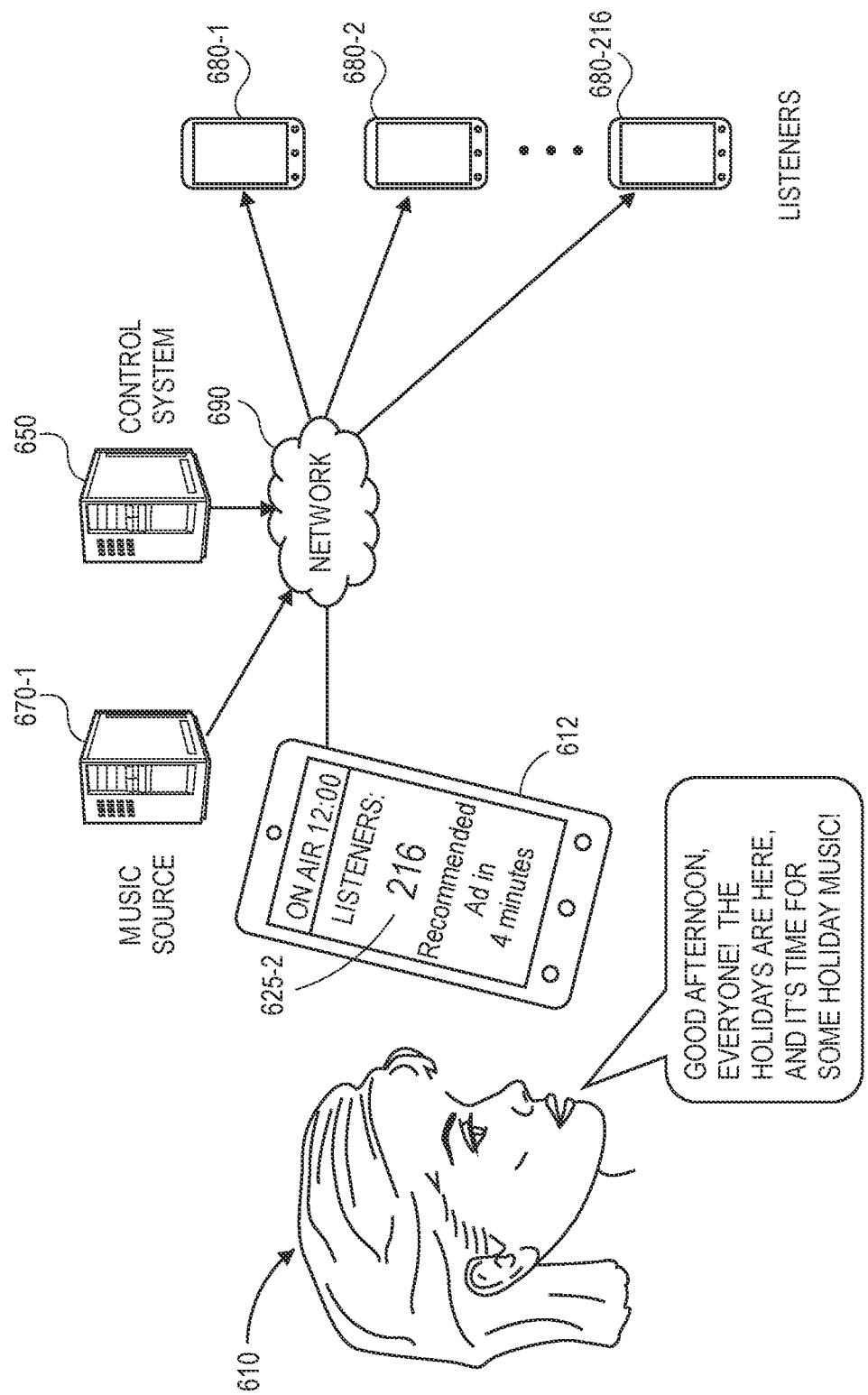

As is shown in FIG. 6D, the creator 610 begins the episode as scheduled, e.g., by providing one or more utterances of words or phrases to the mobile device 612. One or more microphones or other sensors of the mobile device 612 may capture audio data representing the utterances, and transmit the audio data to the control system 650 over the one or more networks 690. The utterances may identify the creator 610, or a theme of the episode, viz., "good afternoon, everyone! The holidays are here, and it's time for some holiday music!" A user interface 625-2 rendered on the mobile device 612 indicates an initial number of listeners to the media program, e.g., two hundred sixteen, and a time at which a recommended slot for airing an advertisement will begin.

Prior to or concurrent with a beginning of the episode, connections (e.g., two-directional communications channels) may be established over the one or more networks 690 between the mobile device 612 of the creator and the control system 650. Additionally, and also prior to or concurrent with the beginning of the episode, or after the episode has begun, connections (e.g., one-directional communications channels) may also be established between the control system 650 and devices 680-1, 680-2 . . . 680-216 of any number of listeners. Additionally, connections (e.g., one-directional communications channels) may be further established between the control system 650 and any other sources of media content, e.g., a music source 670-1, which may have any number of media entities stored thereon. The control system 650 may be configured to receive audio data from the mobile device 612 or the music source 670-1 (or any other sources of media content), and to transmit the audio data to the mobile device 612 or the devices 680-1, 680-2 . . . 680-216 over the one or more networks 690.

Figure 6E:
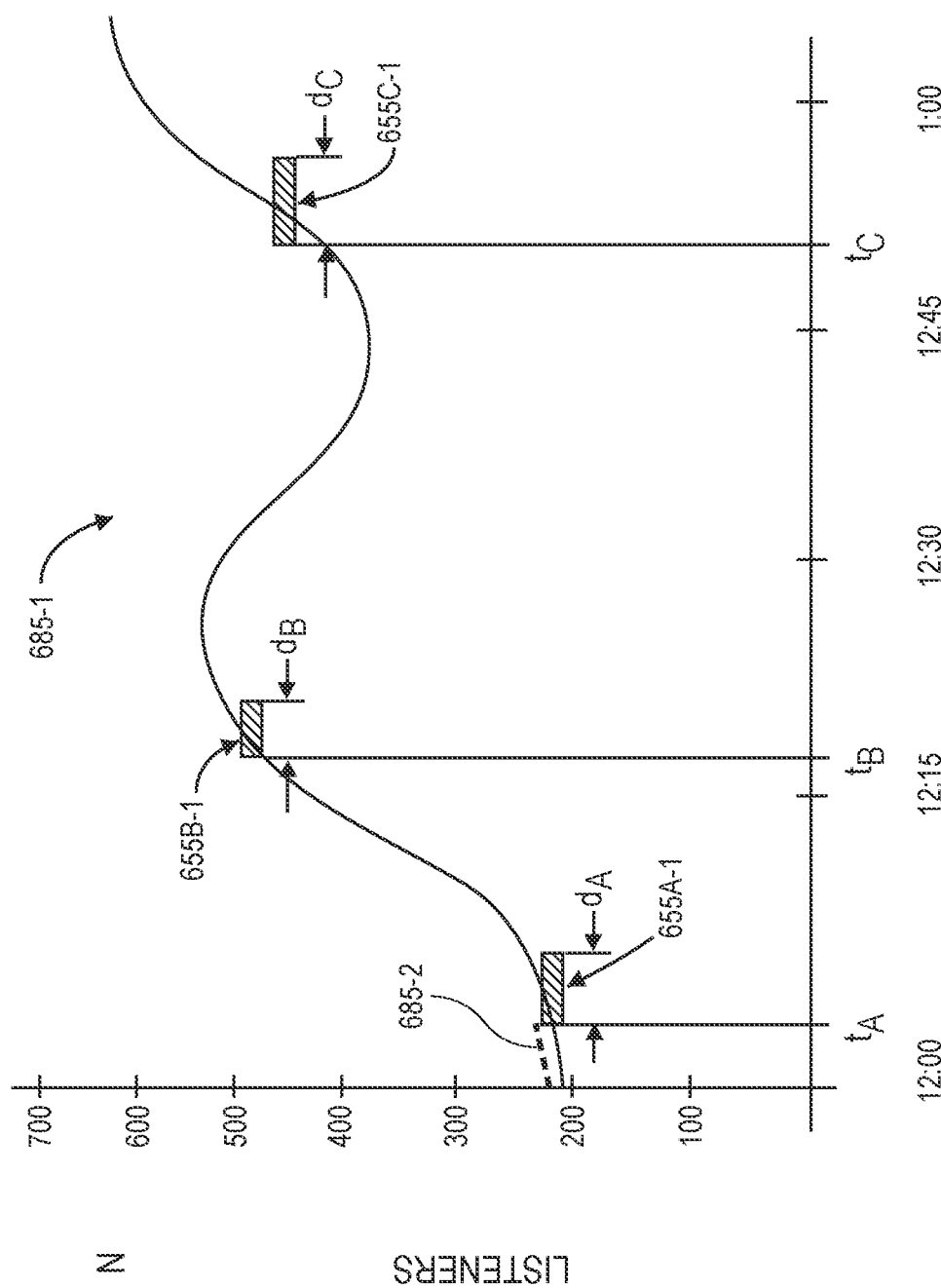

Numbers of listeners, or other information or data regarding listenership, may be tracked and monitored during the episode, and such information or data may be provided to the creator 610, along with any number of recommendations regarding advertisements to be aired during the episode. As is shown in FIG. 6E, data 685-2 representing the numbers of listeners to the episode of the media program is monitored and tracked at various times during the episode with respect to the data 685-1, as the time $t_A$ at which the slot 655A-1 will begin is approached. The data 685-2 regarding the numbers of listeners may be monitored and tracked in any manner, such as by determining numbers of connections between the control system 650 and the devices of listeners at such times, or in any other manner.

Figure 6F:

As is shown in FIG. 6F, a user interface 625-3 including information or data regarding the media program and the slot 655A-1 is rendered on the mobile device 612 of the creator 610. The user interface 625-3 indicates a current time during the episode, viz., 12:04 p.m., which is approximately the time $t_A$ marking a beginning of the slot 655A-1, and identifies number of listeners to the media program at that time, viz., two hundred twenty-five. The user interface 625-3 also includes a visual recommendation that the creator 610 air an advertisement at or near that time, e.g., during the slot 655A-1. The user interface 625-3 further lists a plurality of advertisements that may be aired along with one or more interactive features that, when selected, cause audio data representing the advertisements to be transmitted to the mobile device 612 of the creator 610 and devices of each of the listeners at that time, which may be the same listeners that were listening to the episode at the beginning, or different listeners (e.g., more or fewer listeners). The creator 610 may initiate the airing of one or more of the advertisements by a selection or other activation of any of the interactive features on the user interface 625-3, or decline to air any of the advertisements.

Figure 6G:
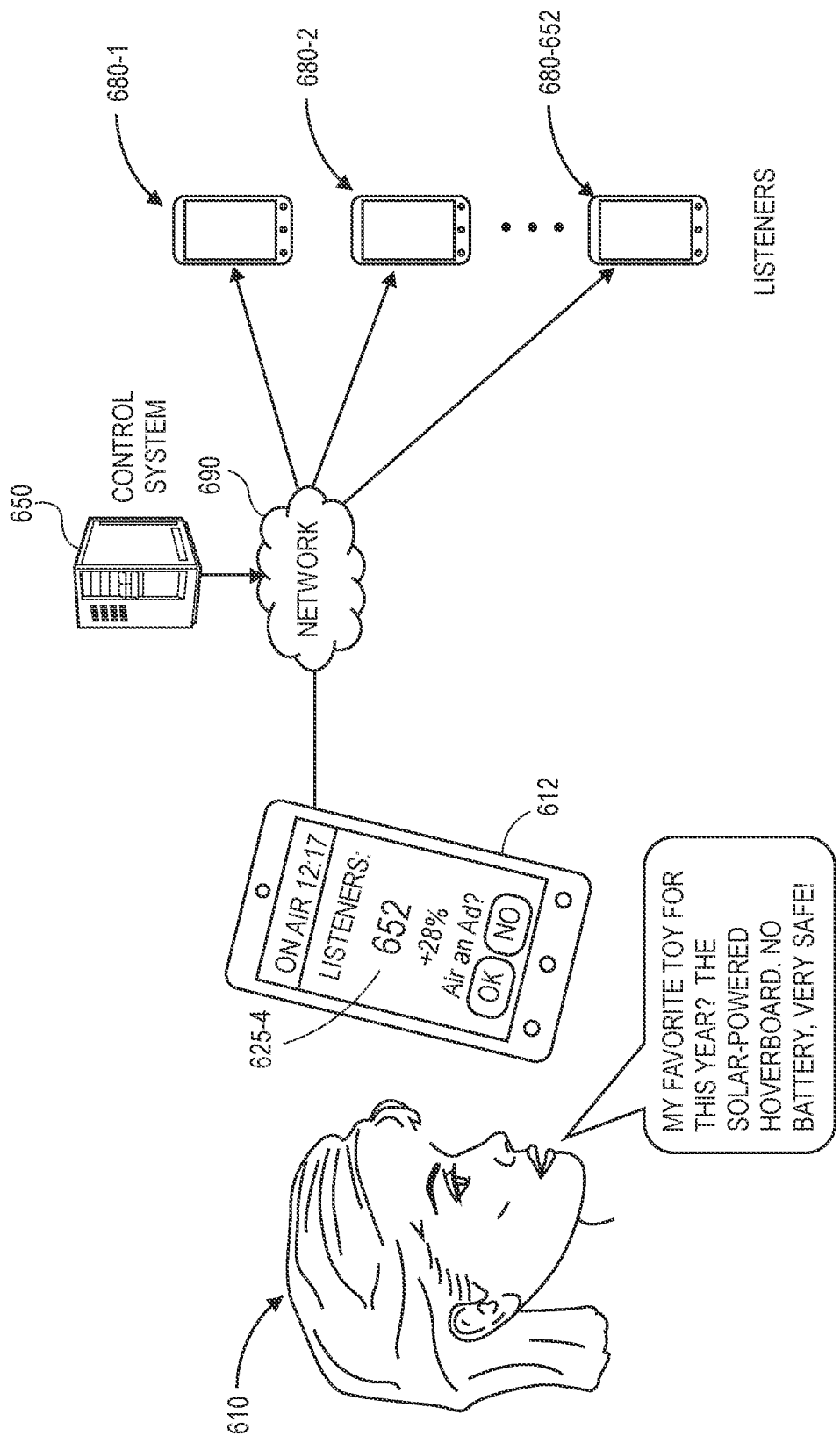

As an episode of a media program continues, numbers of listeners, or other information or data regarding listenership of the episode, may be tracked and monitored. Recommendations of advertisements to the creator 610 may be maintained or updated based on the information or data accordingly. As is shown in FIG. 6G, the creator 610 provides one or more additional utterances of words or phrases to the mobile device 612, viz., "my favorite toy this year? The solar-powered hoverboard. No battery, very safe!" One or more microphones or other sensors of the mobile device 612 capture audio data representing the one or more utterances, and transmit the audio data to the control system 650 over the one or more networks 690. The control system 650 may cause the audio data representing the utterances, or any other media content or other audio data, to be transmitted to a plurality of devices 680-1, 680-2 . . . 680-652 of listeners over the one or more networks 690.

Additionally, a user interface 625-4 rendered on the mobile device 612 indicates a number of listeners to the media program, or six hundred fifty-two, at a time during the episode, viz., 12:17 p.m., and a percent or share by which the number of listeners exceeds a predicted number of listeners at that time. The user interface 625-4 further includes one or more buttons or other interactive features that may be selected or otherwise activated to identify additional information regarding advertisements that may be aired at that time.

Figure 6H:
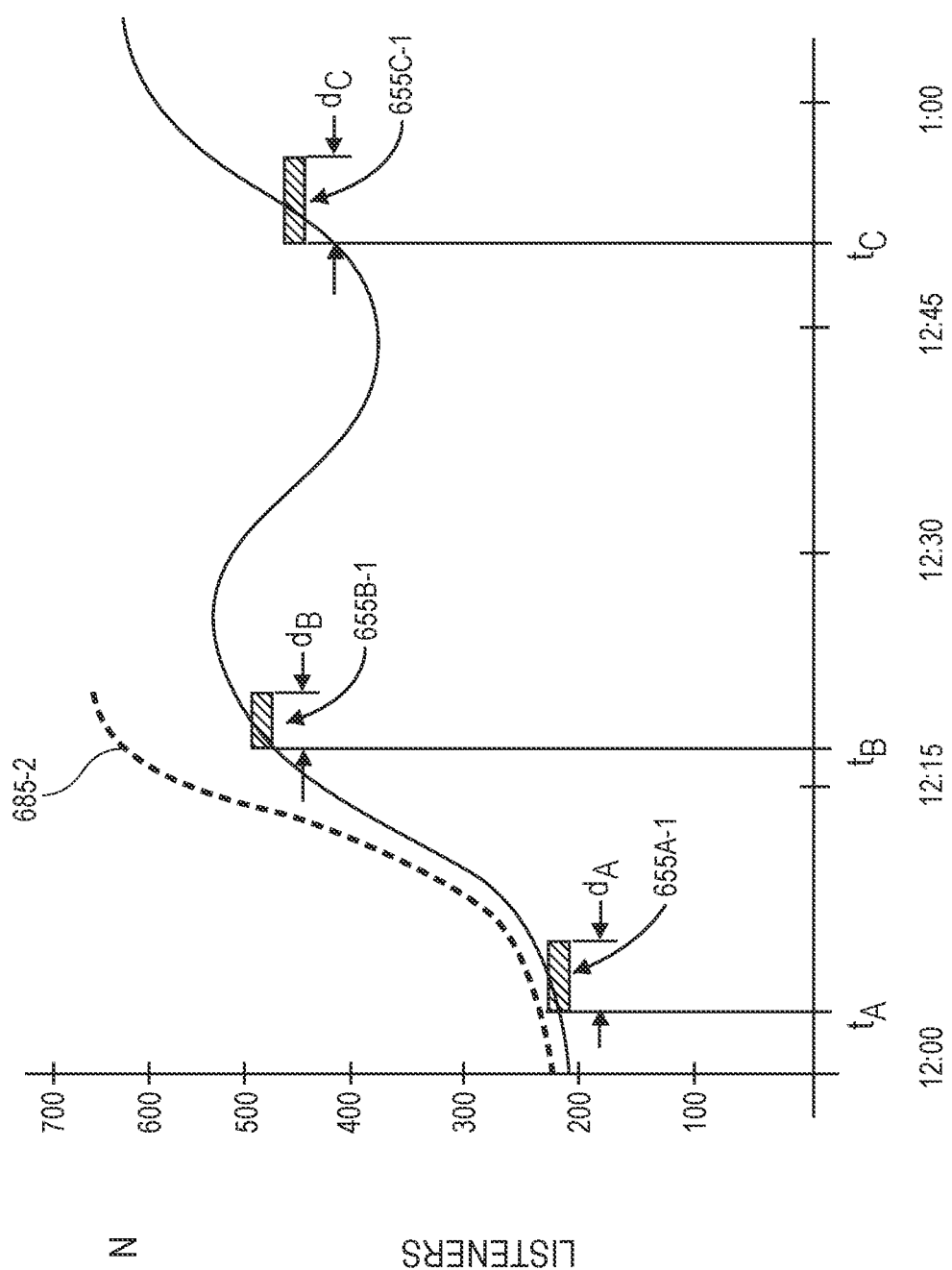

As is shown in FIG. 6H, the data 685-2 representing the numbers of listeners to the episode of the media program is monitored and tracked at various times during the episode with respect to the data 685-1, including after the time $t_B$ at which the slot 655B-1 began, or following the duration $d_B$ of the slot 655B-1. The data 685-2 regarding the numbers of listeners may be monitored and tracked in any manner, such as by determining numbers of connections between the control system 650 and the devices of listeners at such times, or in any other manner. Because the number of listeners at the time at which the creator 610 provided the utterance, as shown in FIG. 6G, greatly exceeds the predicted number of listeners at that time, the airing of one or more advertisements may be deemed to be lucrative, profitable or effective for the creator 610, or may deem to have a low or acceptable risk of losing any listeners to the episode.

Figure 6I:
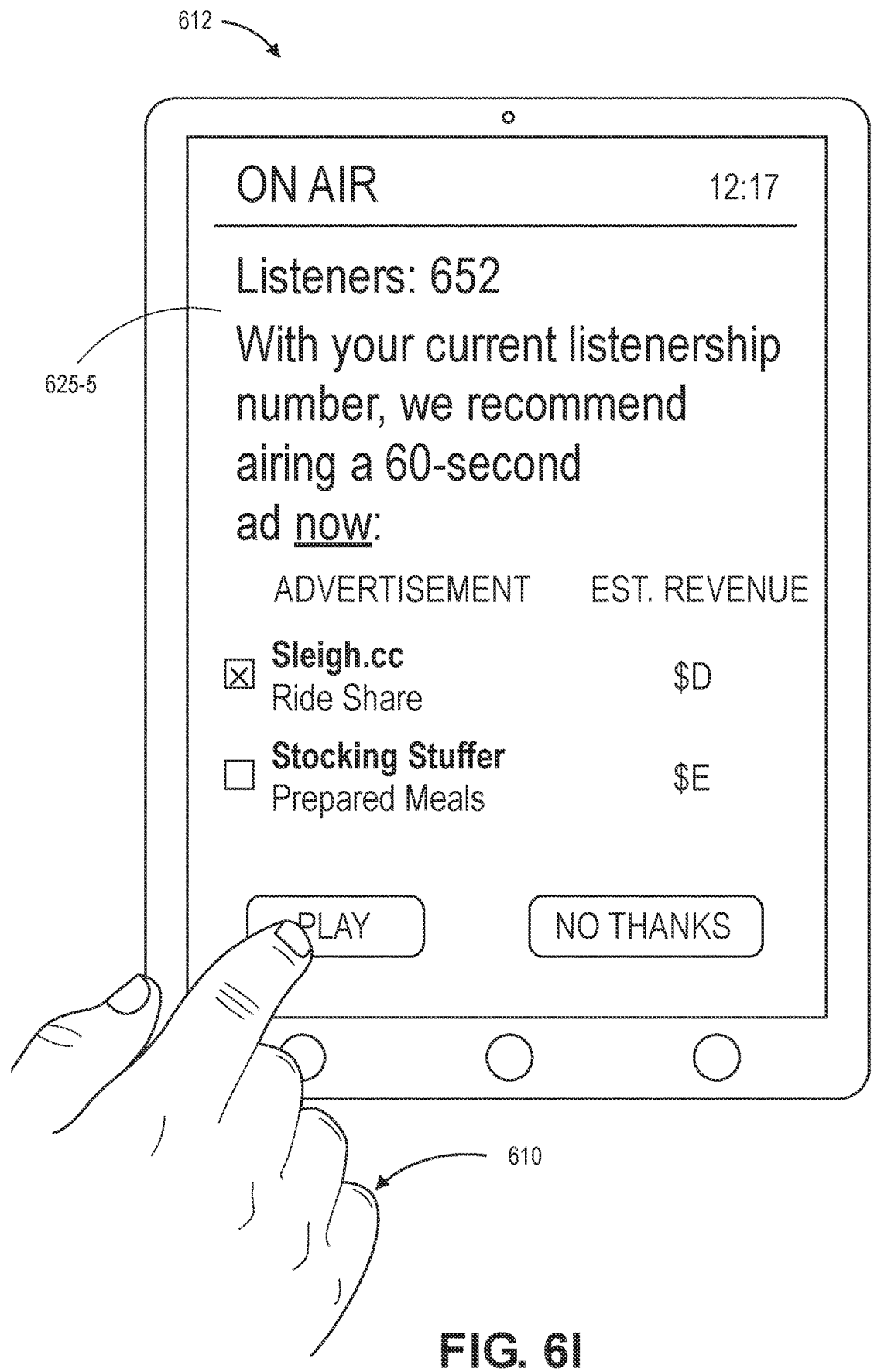

As is shown in FIG. 6I, a user interface 625-5 including information or data regarding listenership to the media program is rendered on the mobile device 612. The user interface 625-5 indicates a current time during the episode, viz., 12:17 p.m., which is after the time $t_B$ marking a beginning of the slot 655B-1, and identifies a number of listeners to the media program, or six hundred fifty-two, at that time. The user interface 625-5 also includes a visual recommendation that the creator 610 air an advertisement at or near that time. The user interface 625-5 further lists a plurality of advertisements that may be aired along with one or more interactive features that, when selected, cause audio data representing the advertisements to be transmitted to the mobile device 612 of the creator 610 and devices of each of the listeners at that time, which may be the same listeners that were listening to the episode at the beginning, or different listeners (e.g., more or fewer listeners). The creator 610 may initiate the airing of one or more of the advertisements by a selection or other activation of any of the interactive features on the user interface 625-5, or decline to air any of the advertisements.

Figure 6J:
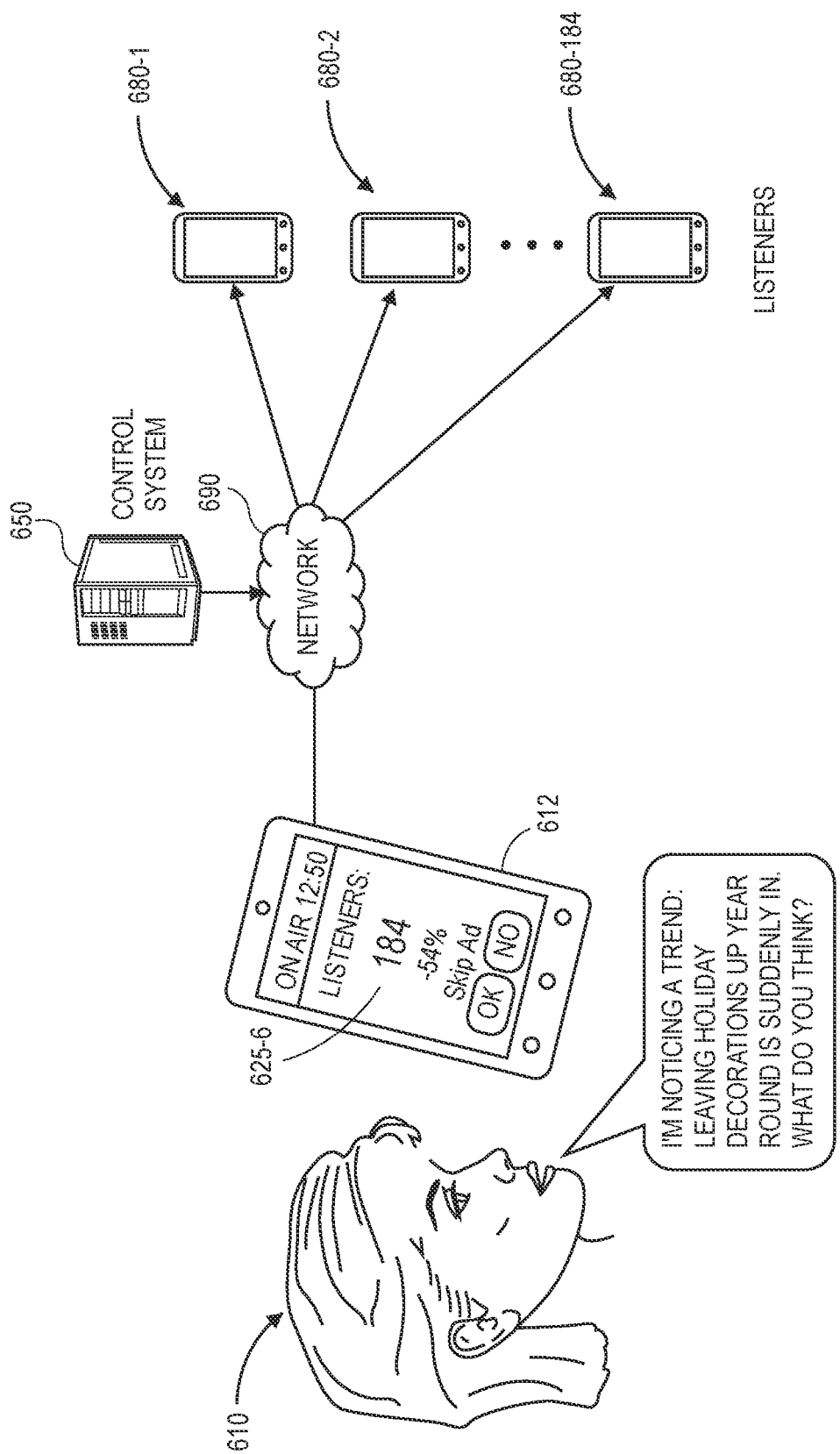

As is shown in FIG. 6J, the creator 610 provides one or more additional utterances of words or phrases to the mobile device 612, viz., "I'm noticing a trend: leaving holiday decorations up year-round is suddenly 'in.' What do you think?" One or more microphones or other sensors of the mobile device 612 capture audio data representing the one or more utterances, and transmit the audio data to the control system 650 over the one or more networks 690. The control system 650 may cause the audio data representing the utterances, or any other media content or other audio data, to be transmitted to a plurality of devices 680-1, 680-2 . . . 680-184 of listeners over the one or more networks 690.

Additionally, a user interface 625-6 rendered on the mobile device 612 indicates a number of listeners to the media program, or one hundred eighty-four, at a time during the episode, viz., 12:50 p.m., or approximately the time $t_C$ marking a beginning of the slot 655C-1, and a percent or share by which the number of listeners is less than a predicted number of listeners at that time. The user interface 625-6 further includes one or more buttons or other interactive features that may be selected or otherwise activated to skip or bypass a recommendation to air one or more advertisements at that time, or to air the one or more advertisements.

Figure 6K:
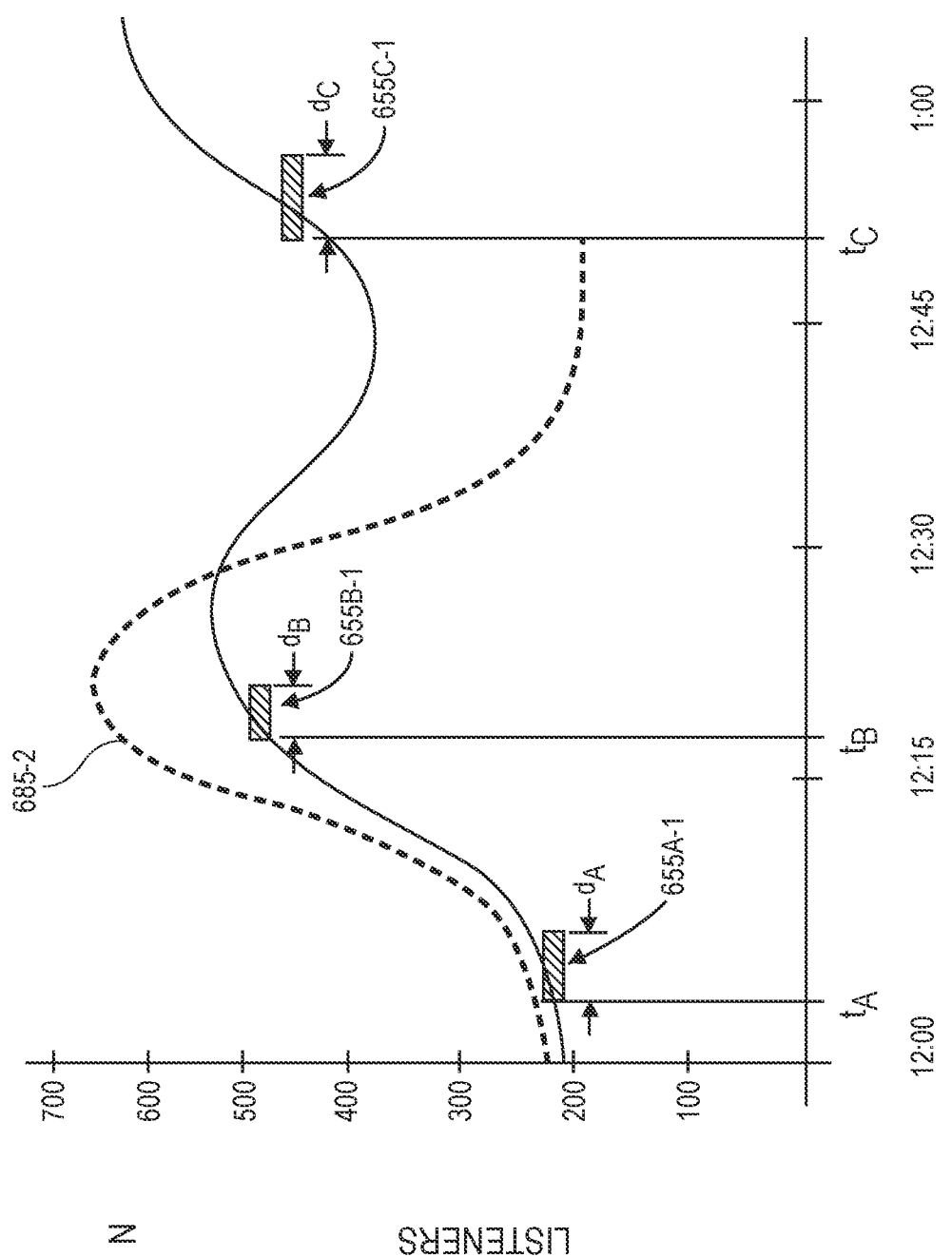

As is shown in FIG. 6K, the data 685-2 representing the numbers of listeners to the episode of the media program is monitored and tracked at various times during the episode with respect to the data 685-1, up to approximately the time $t_C$ marking the beginning of the slot 655C-1. Because the number of listeners at the time at which the creator 610 provided the utterance, as shown in FIG. 6J, is far less than the predicted number of listeners at that time, the airing of one or more advertisements may be deemed to be unprofitable or ineffective for the creator 610, or may deem to have a high or unacceptable risk of losing any listeners to the episode.

Figure 6L:
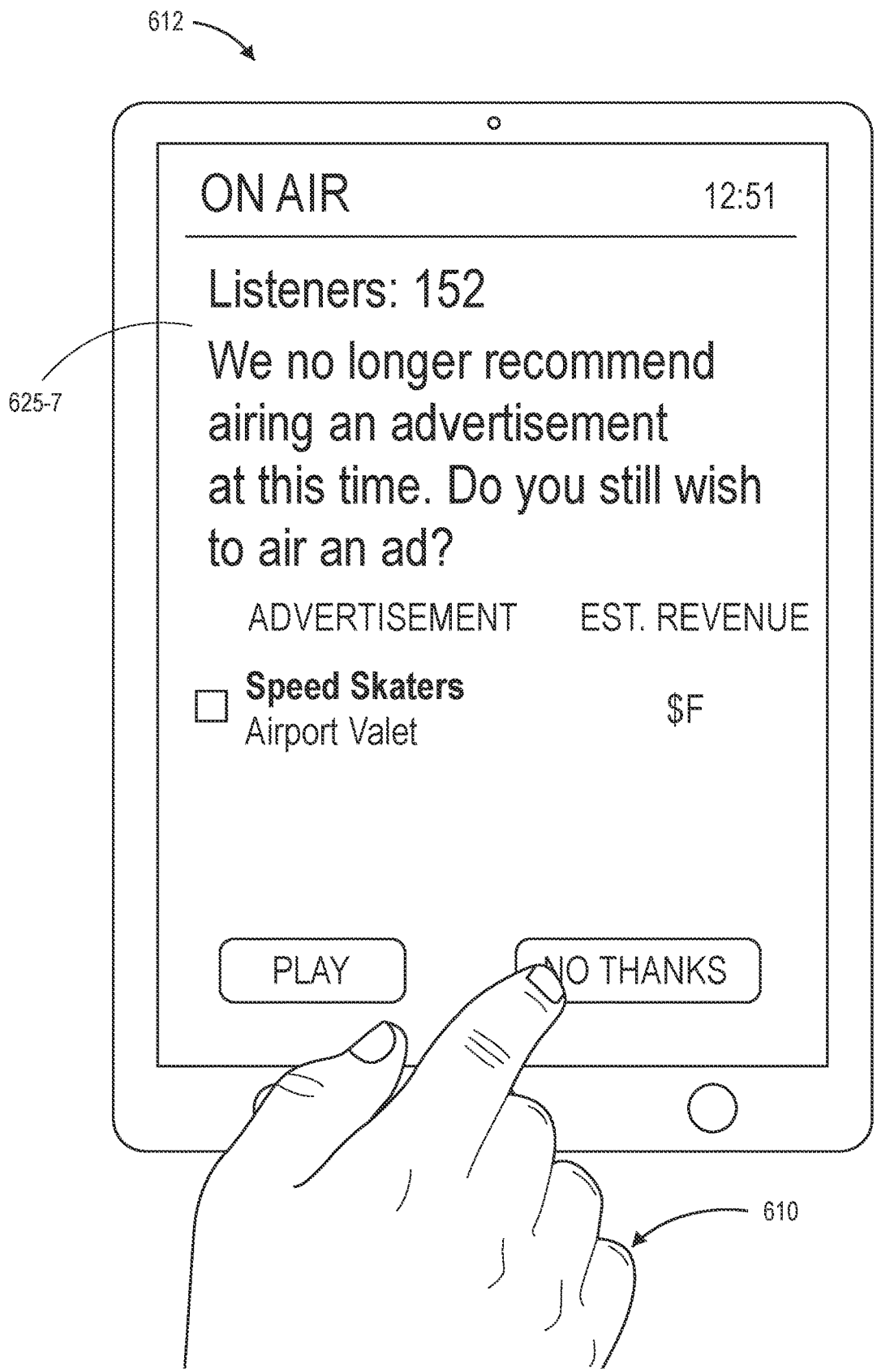

As is shown in FIG. 6L, a user interface 625-7 including information or data regarding listenership to the media program is rendered on the mobile device 612. The user interface 625-7 indicates a current time during the episode, viz., 12:51 p.m., which is approximately the time $t_C$ marking a beginning of the slot 655C-1, and identifies a number of listeners to the media program, or one hundred fifty-two, at that time. The user interface 625-7 also includes a visual recommendation that the creator 610 not air an advertisement at or near that time. The user interface 625-7 does, however, list a plurality of advertisements that may be aired along with one or more interactive features that, when selected, cause audio data representing the advertisements to be transmitted to the mobile device 612 of the creator 610 and devices of each of the listeners at that time. The creator 610 may initiate the airing of one or more of the advertisements by a selection or other activation of any of the interactive features on the user interface 625-7, or decline to air any of the advertisements.

Figure 7:
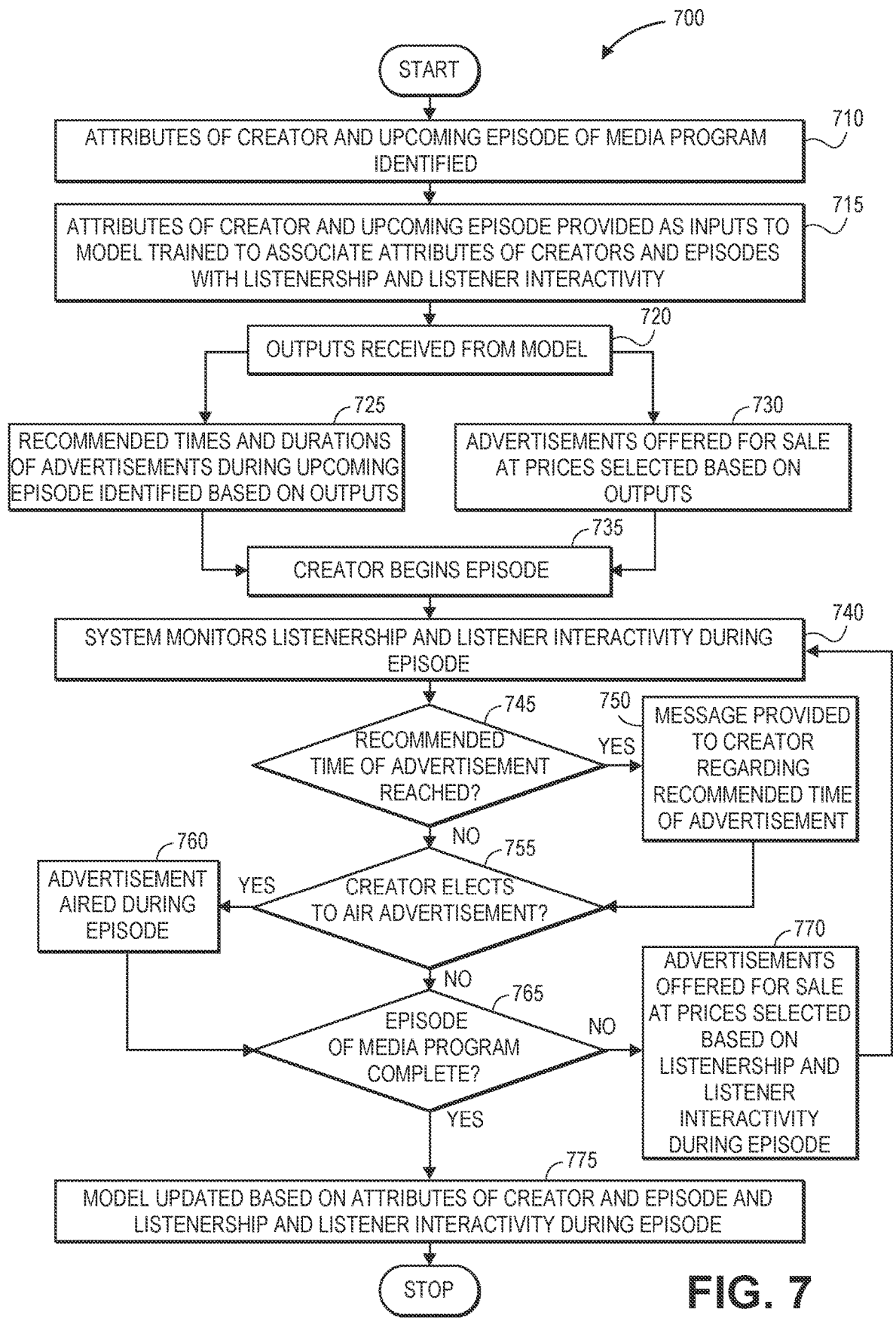
FIG. 7 is a flow chart of one process for selecting times or durations of advertisements in accordance with embodiments of the present disclosure.

Referring to FIG. 7, a flow chart 700 of one process for selecting times or durations of advertisements in accordance with embodiments of the present disclosure is shown. At box 710, attributes of a creator and an upcoming episode of a media program are identified. For example, attributes of the creator may include or represent, but need not be limited to, personal information regarding the creator such as an age of the creator, experience of the creator in generating or producing media programs, a level of indication or occupational history of the creator, or genres, topics or other content or features that the creator is known or has been observed to generate or produce. Attributes of the upcoming episode may include or represent, but need not be limited to, genres, topics or other content or features of prior episodes of the media program, as well as a time or date on which the episode is planned or scheduled to be aired, a duration of the episode, media content that is planned or scheduled to be included in the episode (e.g., audio data representing advertisements, music, news, sports, weather, or other programming, or words that are spoken or sung by participants in the media program), any ratings of the episode (e.g., a maturity rating, a quality rating), or any other attributes.

At box 715, the attributes of the creator and the upcoming episode identified at box 710 are provided as inputs to a model trained to associate attributes of creators and episodes with listenership and listener interactivity. For example, the model may be an artificial neural network, or any other machine learning algorithm, system or technique, such as a gradient-based model, a tree-based model, a learning model, a random forest, a gradient-boosting tree, a transformer (e.g., a bidirectional encoder representation from transformers), or others. At box 720, one or more outputs are received from the model, and at box 725, one or more recommended times and durations for airing advertisements during the upcoming episode are identified based on the outputs received at box 720. Slots (or periods or sections) of the episode, beginning at the times or lasting for the durations, may be determined based on the outputs received at box 720, in any manner or by any technique. For example, the times may be identified as times during an episode during which a number of listeners to the episode is expected to be substantially high or at a maximum number or level, or times at which listeners are deemed most likely to remain engaged with the episode in the event that one or more advertisements are aired at such times. The durations may be selected as durations for which such listeners may be reasonably expected to remain listening to or engaged with the episode, without opting for an episode to a different media program or losing interest in listening to media programs altogether.

At box 730, one or more advertisements are offered for sale at prices selected based on the outputs received at box 720. For example, a price of one or more advertisements may be identified or selected based on any factors, including but not limited to the recommended times or durations determined at box 725 based on the outputs, as well as numbers of listeners that are expected to be listening to the episode at such times, or durations of advertisements to be aired at such times. The advertisements may be offered for sale at such prices to any manufacturer, merchant, seller or vendor of any goods or services, and in any manner, such as by transmitting one or more electronic messages identifying the creator, the media program, a time or date on which the episode is expected to air, or any other information or data regarding the episode or the media program, to one or more computer devices or systems associated with such a manufacturer, merchant, seller or vendor, or in any other manner.

At box 735, the creator begins airing the episode, and at box 740, a system monitors for listenership and listener interactivity during the airing of the episode. For example, at a scheduled time associated with the episode or the media program, or at a random time, one or more connections may be established between a control system and a device of the creator of the media program, and between the control system and devices of listeners to the media program. In some implementations, a two-way communications channel may be established between a control system and a computer device (e.g., a mobile device, or any other device) of the creator, thereby enabling the creator to transmit audio data representing words that are spoken, sung or otherwise created by the creator to the control system, and to receive audio data from the control system, by way of the computer device. Likewise, one-way communication channels may be established between the control system and each of the devices of the listeners, thereby enabling the listeners to receive audio data from the control system, by way of the devices. In some implementations, the connections may be established by or between multiple systems, such as a conference system, a mixing system, a broadcast system, or any other systems, alone or in addition to a control system. Moreover, in some implementations, connections may be established between a control system (or any other systems) and devices or systems of other participants in the media program, e.g., sources of advertisements, music, news, sports, weather, or other programming, or humans other than the creator or any listeners.

Media content is received by the control system from various sources and transmitted to devices or systems of users of the media program (e.g., the creator, the listeners or any other guests or other participants in the episode of the media program) for playing in accordance with the episode media program. The media content may include or be represented in audio data captured by one or more devices of the creator, or audio data stored or otherwise maintained by one or more sources, that is transmitted to a control system and to the various other devices with which the control system is connected.

In some implementations, devices or systems of users of the media program may render or display one or more user interfaces thereon, and such user interfaces may be configured to receive one or more interactions from such users during an episode of the media program. The user interfaces may include one or more interactive features that enable users to express an opinion or another emotion regarding media content, e.g., any number of icons, characters, symbols or other visual indicators, each of which may correspond to one of a plurality of emotions, opinions or characterizations, and may be selected or otherwise interacted by listeners to indicate their emotions, opinions or characterizations at any given time. For example, the user interfaces may include one or more "widgets," application programming interfaces (e.g., "API"), or other features that are configured to receive interactions in the form of entries of text, characters or symbols, as well as selections or other interactions indicating an emotion or an opinion regarding the media program. Interactions that may be received by such user interfaces may include, but need not be limited to, selections of one or more icons, characters, symbols or other visual indicators provided on the user interfaces, which may be processed to confirm that a user approves of media content then being played, disapproves of the media content, or has some emotion or opinion other than approval or disapproval of the media content.

Alternatively, or additionally, interactions received from users may include actions by a user to play or pause a media program, or to fast-forward or rewind the media program, and such interactions may be processed or interpreted to determine whether the user has a positive emotion or opinion, a negative emotion or opinion, or an emotion or an opinion that is neither positive nor negative at any given time with respect to the media program. Likewise, when a user generates or sends a chat message, such interactions (or contents of the chat message) may be processed or interpreted to determine an emotion or an opinion of the user at any given time with respect to the media program. When a user attempts to join an episode, play the episode stop the episode, search for another media program, or end the playing of media altogether either permanently or for a period of time, such interactions may also be processed or interpreted to determine an emotion or an opinion of the user at any given time with respect to the episode of the media program.

Furthermore, in some implementations, an interaction may be received from a user by any voice-controlled devices or software (e.g., a personal assistant). For example, one or more devices of a user may be configured to receive voice commands that may be processed to identify feedback represented therein.

At box 745, whether a recommended time of an advertisement has been reached is determined. For example, the recommended time associated with a slot (or a period or a section) of the episode of the media program may be identified or determined with respect to an amount of time following a start of the episode, e.g., a number of minutes, or in absolute terms, e.g., a time of day during the episode, and whether the recommended time has been reached may be determined by one or more clocks or timers associated with a device or system of a creator, a control system, or any other device or system.

If a recommended time of an advertisement has been reached, then the process advances to box 750, where a message is provided to the creator regarding the recommended time of the advertisement. For example, the control system or any other device or system may cause a window or another user interface indicating that the recommended time has been reached to be displayed on a device or system of the creator. The user interface may include information suggesting to the creator that an advertisement be aired at the recommended time, or for a recommended duration. In some implementations, the window or user interface may include names or other identifiers of one or more advertisements that may be aired by the creator at the recommended time, or scripts of words or topics of conversation to be spoken or sung by the creator in accordance with such advertisements, or one or more interactive features that may be selected by the creator to cause audio content representing such advertisements to be aired, as well as durations of such advertisements. Alternatively, one or more of such features may be continuously displayed in a window or a user interface rendered by a device or system of the creator throughout the episode, thereby enabling the creator to air an advertisement at any time during the episode of the media program.

If a recommended time of an advertisement has not been reached at box 745, or after the message is provided to the creator at box 750, then the process advances to box 755, where whether the creator has elected to air an advertisement is determined. If the customer has elected to air the advertisement, then the process advances to box 760, where the advertisement is aired during the episode. For example, the creator may speak or sing one or more words of the advertisement, or cause audio data representing the advertisement to be aired, either at the recommended time at box 745 or at any other time.

If the creator has not elected to air an advertisement at box 755, or after the advertisement is aired during the episode at box 760, then the process advances to box 765, where whether the episode of the media program is complete is determined. For example, the episode may be defined with respect to a fixed start time and a fixed end time, or a fixed duration, and may end at the fixed end time or after the fixed duration. Alternatively, a creator may elect to terminate a media program at a time or after a duration of his or her choosing, e.g., by one or more interactions with user interfaces rendered on his or her device or system, or in any other manner.

If the episode of the media program is not complete, then the process advances to box 770, where one or more advertisements are offered for sale at prices selected based on the listenership and the listener interactivity during the episode, as determined at box 740. For example, the prices may be the same prices at which advertisements were offered at box 730, or different prices, which may be identified or selected based on any factors, including but not limited to updated numbers of listeners that are currently listening to the episode. In some implementations, information regarding the episode (e.g., attributes of the creator and updated attributes of the episode) may be provided to one or more models, e.g., the same model to which attributes of the creator and the episode were provided at box 715, or a different model, and recommended times or durations of advertisements to be aired may be identified based on outputs received in response to the inputs. Advertisements may be offered for sale at such prices to any manufacturer, merchant, seller or vendor of any goods or services, and in any manner. The process then returns to box 740, where the system continues to monitor for listenership and listener interactivity during the airing of the episode.

If the episode of the media program is complete, however, then the process advances to box 775, where the model is updated based on the attributes of the creator and the episode identified at box 710, and the listenership and the listener interactivity during the episode as determined at box 740, and the process ends. For example, the attributes of the creator and the attributes of the episode may be updated or determined following the media program, and used along with any data regarding listenership or listener interactivity, to further train the model based on the conduct of the creator during the episode of the media program, as well as numbers of listeners or interactions received from such listeners during the episode of the media program.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 4 or 7, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least one data store and at least one computer processor,
   wherein the first computer system is connected to one or more networks,
   wherein the at least one data store has one or more sets of instructions stored thereon that, when executed by the at least one computer processor, cause the first computer system to perform a method comprising:
   receiving first information from a second computer system associated with a creator of a media program, wherein the first information identifies at least one of:
   the creator;
   a topic of discussion during an episode of the media program;
   a media entity to be played during the episode;
   a guest participating in the episode of the media program;
   providing at least a portion of the first information as an input to a machine learning model executed by the first computer system, wherein the machine learning model is trained to determine a number of listeners to a media program at one or more times during the media program based at least in part on attributes of the media program;

receiving an output from the machine learning model;
predicting numbers of listeners to the episode at a plurality of times during the episode based at least in part on the output;
selecting a portion of the episode based at least in part on the predicted numbers of listeners, wherein the selected portion of the episode includes at least a first time of the plurality of times, and wherein the number of listeners at the first time is one of:
  a local maximum number of listeners to the episode;
  an absolute maximum number of listeners to the episode; or
  an inflection point in the numbers of listeners to the episode;
transmitting second information regarding at least the selected portion of the episode to the second computer system over the one or more networks, wherein the second information comprises:
  an identifier of a predicted number of listeners to the episode at the first time;
  an identifier of the selected portion of the episode;
  an identifier of at least one advertisement;
  an identifier of an estimated revenue associated with the at least one advertisement; and
  an interactive feature, wherein the interactive feature, when selected, is configured to cause audio data representing at least the at least one advertisement to be transmitted to at least a third computer system associated with a listener to the episode; and
causing a display of a user interface by the second computer system, wherein the user interface includes at least some of the second information rendered therein.

2. The first computer system of claim 1, wherein the second information is transmitted to the second computer system at approximately the first time.

3. The first computer system of claim 1, wherein the machine learning model comprises at least one of:
  an artificial neural network;
  a gradient-based model;
  a random forest model;
  a tree-based model; or
  one or more transformers.

4. The first computer system of claim 1, wherein the method further comprises:
  selecting the at least one advertisement based at least in part on the first information.

5. The first computer system of claim 4, wherein the method further comprises:
  determining numbers of listeners to the episode at a plurality of times during the episode; and
  selecting at least one of the first time or a duration of the at least one advertisement based at least in part on the numbers of listeners to the episode at the plurality of times.

6. A computer-implemented method comprising:
receiving, by at least a first computer system from a second computer system, first information regarding at least a first episode of a first media program, wherein a first creator is associated with the first media program;
determining, by at least the first computer system, at least a first attribute of one of the first media program or the first creator;
identifying, by at least the first computer system, at least a second attribute of one of a second media program or a second creator associated with the second media program;
identifying, by at least the first computer system, second information regarding listenership to at least the second episode of the second media program, wherein the second information identifies a number of listeners to the second episode at a second time during the second episode;
determining, by at least the first computer system, third information regarding listenership to the first episode of the first media program based at least in part on the first attribute, the second attribute and the second information regarding the listenership to at least the second episode, wherein the third information comprises a predicted number of listeners to the first episode at a first time, and wherein the first time follows the second time;
selecting, by at least the first computer system, at least a first portion of the first episode for airing at least one advertisement based at least in part on the third information;
transmitting, by at least the first computer system to the second computer system, fourth information identifying at least the first portion; and
causing, by at least the first computer system, at least a portion of the fourth information to be displayed in a user interface rendered on a display of the second computer system, wherein the portion of the fourth information comprises:
  an identifier of the predicted number of listeners to the first episode at the first time;
  an identifier of the first portion of the first episode;
  an identifier of the at least one advertisement;
  an identifier of an estimated revenue associated with the at least one advertisement; and
  an interactive feature, wherein the interactive feature, when selected, is configured to cause audio data representing at least the at least one advertisement to be transmitted to at least a third computer system associated with a listener to the first episode.

7. The computer-implemented method of claim 6, wherein the first attribute comprises at least one of:
  a date on which the first episode is scheduled;
  an identifier of first media content to be played during at least a portion of the first episode; or
  a rating of one of the first creator or the first media program, and wherein the second attribute comprises at least one of:
  a date on which a second episode of the second media program was transmitted to at least one computer system by the first computer system, wherein the date on which the first episode is scheduled follows the date on which the second episode was transmitted to the at least one computer system;
  an identifier of second media content played during at least a portion of the second episode; or
  a rating of one of the second creator or the second media program.

8. The computer-implemented method of claim 6, further comprising:
  training, by at least the first computer system, a machine learning model to associate attributes of media programs or creators with listenership to the media programs based at least in part on the second attribute and the second information, wherein determining the third information regarding the listenership to the first episode comprises:
  providing, by at least the first computer system, at least the first attribute to the machine learning model as a first input; and
  receiving, by at least the first computer system, a first output from the machine learning model in response to the first input,
  wherein the third information is determined based at least in part on the first output.

9. The computer-implemented method of claim 8, further comprising:
  determining, by at least the first computer system, fifth information regarding listenership to the first episode of the first media program, wherein the fifth information comprises an actual number of listeners to the first episode at the first time,
  wherein the first portion is selected based at least in part on a difference between the predicted number of listeners to the first episode at the first time and the actual number of listeners to the first episode at the first time.

10. The computer-implemented method of claim 9, further comprising:
  training, by at least the first computer system, the machine learning model based at least in part on the difference.

11. The computer-implemented method of claim 9, further comprising:
  determining, by at least the first computer system, at least a third attribute of the first episode of the media program based at least in part on the fifth information;
  providing, by at least the first computer system, at least the third attribute to the machine learning model as a second input;
  receiving, by at least the first computer system, a second output from the machine learning model in response to the second input;
  determining, by at least the first computer system, sixth information regarding listenership to the first episode of the first media program based at least in part on the second output, wherein the sixth information comprises a predicted number of listeners to the first episode at a third time, and wherein the third time follows the first time;
  selecting, by at least the first computer system, at least a second portion of the first episode for airing at least one advertisement based at least in part on the sixth information; and
  transmitting, by at least the first computer system to the second computer system, seventh information identifying at least the second portion.

12. The computer-implemented method of claim 8, wherein the machine learning model comprises at least one of:
  an artificial neural network;
  a gradient-based model;
  a random forest model;
  a tree-based model; or
  one or more transformers.

13. The computer-implemented method of claim 6, further comprising:
  determining, by at least the first computer system, numbers of listeners to the first episode at a plurality of times during the first episode based at least in part on the first information; and
  selecting, by at least the first computer system, at least one of the first time or a duration of the at least one advertisement based at least in part on the numbers of listeners to the first episode at the plurality of times.

14. The computer-implemented method of claim 13, further comprising:
  determining, by at least the first computer system, at least one of:
    an absolute maximum of the numbers of listeners to the first episode at the plurality of times;
    a local maximum of the numbers of listeners to the first episode at the plurality of times; or
    an inflection point of the numbers of listeners to the first episode at the plurality of times,
  wherein the at least one of the first time or the duration is selected based at least in part on the at least one of the absolute maximum, the local maximum or the inflection point.

15. The computer-implemented method of claim 6, wherein the first information identifies at least one of:
  a topic of the first episode;
  a media entity to be included in the first episode;
  a guest participating in the first episode;
  a time at which the first episode will begin;
  a time at which the first episode will conclude; or
  a duration of the first episode.

16. The computer-implemented method of claim 6, further comprising:
  determining, by at least the first computer system, at least a first price for an advertisement to be aired during the first portion; and
  offering, by at least the first computer system, at least one advertisement for sale at the first price.

17. The computer-implemented method of claim 6, wherein at least the portion of the fourth information is caused to be displayed in the user interface at approximately the first time.

18. A method comprising:
  determining a first attribute of a first media program;
  determining a second attribute of a creator of the first media program;
  providing at least the first attribute and the second attribute as first inputs to a model, wherein the model is trained to determine a number of listeners to a media program at one or more times during the media program based at least in part on attributes of the media program;
  receiving at least a first output from the model in response to the first inputs;
  predicting, at each of a plurality of times, a number of listeners to an episode of the first media program based at least in part on the first output;
  selecting a portion of the episode of the first media program based at least in part on a first number of listeners to the episode of the first media program at a first time predicted by the model, wherein the first time is one of the plurality of times, and wherein the first time is during the portion of the episode; and
  causing a display of information regarding the portion of the episode of the first media program on a display of a computer device associated with the creator of the first media program, wherein the information comprises:
    an identifier of the first number of listeners to the episode of the first media program;
    an identifier of the portion of the first episode;
    an identifier of at least one advertisement;
    an identifier of an estimated revenue associated with the at least one advertisement; and an interactive feature, wherein the interactive feature, when selected, is configured to cause audio data representing at least the at least one advertisement to be transmitted to at least a third computer system associated with a listener to the first episode.

19. The method of claim 18, wherein the first attribute comprises:
   a topic of the episode;
   a media entity to be included in the episode;
   a guest participating in the episode;
   a time at which the episode will begin;
   a time at which the episode will conclude; or
   a duration of the episode.

20. The method of claim 18, further comprising:
   determining a second number of listeners to the episode of the first media program at the first time; and
   calculating a difference between the first number of listeners and the second number of listeners, wherein the portion of the first media program is selected based at least in part on the difference.

* * * * *